(12) United States Patent
Hsieh et al.

(10) Patent No.: US 9,335,514 B2
(45) Date of Patent: May 10, 2016

(54) IMAGING OPTICAL SYSTEM, IMAGE CAPTURING DEVICE AND MOBILE TERMINAL

(71) Applicant: LARGAN PRECISION CO., LTD., Taichung (TW)

(72) Inventors: Dung-Yi Hsieh, Taichung (TW); Chun-Che Hsueh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/446,618

(22) Filed: Jul. 30, 2014

(65) Prior Publication Data

US 2015/0338610 A1 Nov. 26, 2015

(30) Foreign Application Priority Data

May 26, 2014 (TW) .............................. 103118248 A

(51) Int. Cl.
   *G02B 9/60* (2006.01)
   *G02B 13/00* (2006.01)
   *H04N 5/225* (2006.01)

(52) U.S. Cl.
   CPC .............. *G02B 13/0045* (2013.01); *G02B 9/60* (2013.01); *G02B 13/0015* (2013.01); *H04N 5/2254* (2013.01)

(58) Field of Classification Search
   CPC .............................. G02B 9/60; G02B 13/0045
   See application file for complete search history.

(56) References Cited

U.S. PATENT DOCUMENTS

| 7,443,610 | B1 | 10/2008 | Lin et al. |
| 8,179,618 | B2 | 5/2012 | Baba |
| 8,477,432 | B2 | 7/2013 | Huang et al. |
| 8,482,863 | B2 | 7/2013 | Tsai et al. |
| 8,537,472 | B2 | 9/2013 | Tsai et al. |

(Continued)

FOREIGN PATENT DOCUMENTS

| CN | 202661703 U | 1/2013 |
| CN | 202693899 U | 1/2013 |

(Continued)

OTHER PUBLICATIONS

English translation of abstract of CN 202794675 U (published Mar. 13, 2013).

(Continued)

*Primary Examiner* — Joseph P Martinez
(74) *Attorney, Agent, or Firm* — McClure, Qualey & Rodack, LLP

(57) ABSTRACT

An imaging optical system includes, in order from an object side to an image side, a first lens element, a second lens element, a third lens element, a fourth lens element and a fifth lens element. The first lens element with refractive power has an object-side surface being convex in a paraxial region and an image-side surface being concave in a paraxial region. The second lens element with positive refractive power has an image-side surface being convex in a paraxial region. The third lens element with negative refractive power has an image-side surface being concave in a paraxial region. The fourth lens element with positive refractive power has an image-side surface being convex in a paraxial region. The fifth lens element with negative refractive power has an image-side surface being concave in a paraxial region and having a convex shape in an off-axial region thereof.

40 Claims, 21 Drawing Sheets

(56) References Cited

U.S. PATENT DOCUMENTS

| | | |
|---|---|---|
| 8,649,113 B1 | 2/2014 | Tsai et al. |
| 8,687,293 B2 | 4/2014 | Chen et al. |
| 8,780,459 B2 | 7/2014 | Chen et al. |
| 8,792,185 B2 | 7/2014 | Hsu et al. |
| 2012/0162769 A1 | 6/2012 | Suzuki et al. |
| 2013/0050848 A1* | 2/2013 | Lee .................. G02B 13/0045 359/714 |
| 2013/0093942 A1 | 4/2013 | Okano |
| 2013/0279023 A1 | 10/2013 | Chen |
| 2013/0321932 A1 | 12/2013 | Hsu et al. |
| 2014/0085735 A1 | 3/2014 | Shih |
| 2014/0211328 A1 | 7/2014 | Hashimoto et al. |
| 2015/0098137 A1 | 4/2015 | Chung et al. |
| 2015/0219879 A1 | 8/2015 | Zhao et al. |

FOREIGN PATENT DOCUMENTS

| | | |
|---|---|---|
| CN | 202794675 U | 3/2013 |
| CN | 202837661 U | 3/2013 |
| JP | 2010-008562 | 1/2010 |
| TW | 201331619 | 8/2013 |
| TW | 201339632 | 10/2013 |
| TW | 201403121 | 1/2014 |
| WO | 2013/058111 | 4/2013 |

OTHER PUBLICATIONS

English translation of abstract of JP 2010-008562 (published Jan. 14, 2010).

English translation of abstract of WO 2013/058111 (published Apr. 25, 2013).

English translation of abstract of CN 202837661U (published Mar. 27, 2013).

English translation of abstract of CN 202693899U (published Jan. 23, 2013).

English translation of abstract of CN 202661703U (published Jan. 9, 2013).

English translation of abstract of TW 201403121 (published Jan. 16, 2014).

English translation of abstract of TW 201339632 (published Oct. 1, 2013).

English translation of abstract of TW 201331619 (published Aug. 1, 2013).

* cited by examiner

IMAGING OPTICAL SYSTEM, IMAGE CAPTURING DEVICE AND MOBILE TERMINAL

RELATED APPLICATIONS

This application claims priority to Taiwan Application Serial Number 103118248, filed May 26, 2014, which is incorporated by reference herein in its entirety.

BACKGROUND

1. Technical Field

The present disclosure relates to an imaging optical system and an image capturing device. More particularly, the present disclosure relates to a compact imaging optical system and an image capturing device applicable to mobile terminals.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with five-element lens structure are also developed. However, it is unfavorable for arranging the lens elements, especially for the optical systems with large field of view, since the total track length is usually excessively long. Moreover, the difficulty of structure design for abutting and joining lens elements together is increased so as to intensify the tilt and decenter, which might lead to problems of worse image.

SUMMARY

According to one aspect of the present disclosure, an imaging optical system includes, in order from an object side to an image side, a first lens element, a second lens element, a third lens element, a fourth lens and a fifth lens element. The first lens element with refractive power has an object-side surface being convex in a paraxial region thereof and an image-side surface being concave in a paraxial region thereof. The second lens element with positive refractive power has an image-side surface being convex in a paraxial region thereof. The third lens element with negative refractive power has an image-side surface being concave in a paraxial region thereof. The fourth lens element with positive refractive power has an image-side surface being convex in a paraxial region thereof. The fifth lens element with negative refractive power has an image-side surface being concave in a paraxial region thereof, wherein an object-side surface and the image-side surface of the fifth lens element are aspheric, and the image-side surface of the fifth lens element has at least one convex shape in an off-axial region thereof. The imaging optical system has a total of five lens elements with refractive power. When a focal length of the first lens element is f1, a focal length of the second lens element is f2, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of an object-side surface of the second lens element is R3, and a curvature radius of the image-side surface of the second lens element is R4, the following conditions are satisfied:

$|f2/f1|<0.70;$ $0.60<T12/(T23+T34+T45);$ and $0.40<(R3+R4)/(R3-R4).$

According to another aspect of the present disclosure, an image capturing device includes the imaging optical system according to the aforementioned aspect and an image sensor, wherein the image sensor is located on or near an image plane of the imaging optical system.

According to still another aspect of the present disclosure, a mobile terminal includes the image capturing device according to the foregoing aspect.

According to yet another aspect of the present disclosure, an imaging optical system includes, in order from an object side to an image side, a first lens element, a second lens element, a third lens element, a fourth lens and a fifth lens element. The first lens element with refractive power has an object-side surface being convex in a paraxial region thereof and an image-side surface being concave in a paraxial region thereof. The second lens element with positive refractive power has an image-side surface being convex in a paraxial region thereof. The third lens element has negative refractive power. The fourth lens element with positive refractive power has an image-side surface being convex in a paraxial region thereof. The fifth lens element with negative refractive power has an image-side surface being concave in a paraxial region thereof, wherein an object-side surface and the image-side surface of the fifth lens element are aspheric, and the image-side surface of the fifth lens element has at least one convex shape in an off-axial region thereof. The imaging optical system has a total of five lens elements with refractive power. When a focal length of the first lens element is f1, a focal length of the second lens element is f2, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of an object-side surface of the second lens element is R3, and a curvature radius of the image-side surface of the second lens element is R4, the following conditions are satisfied:

$|f2/f1|<0.70;$ $1.8<T12/(T23+T34+T45);$ and $-0.1<(R3+R4)/(R3-R4).$

According to further another aspect of the present disclosure, an image capturing device includes the imaging optical system according to the aforementioned aspect and an image sensor, wherein the image sensor is located on or near an image plane of the imaging optical system.

According to still another aspect of the present disclosure, a mobile terminal includes the image capturing device according to the foregoing aspect.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
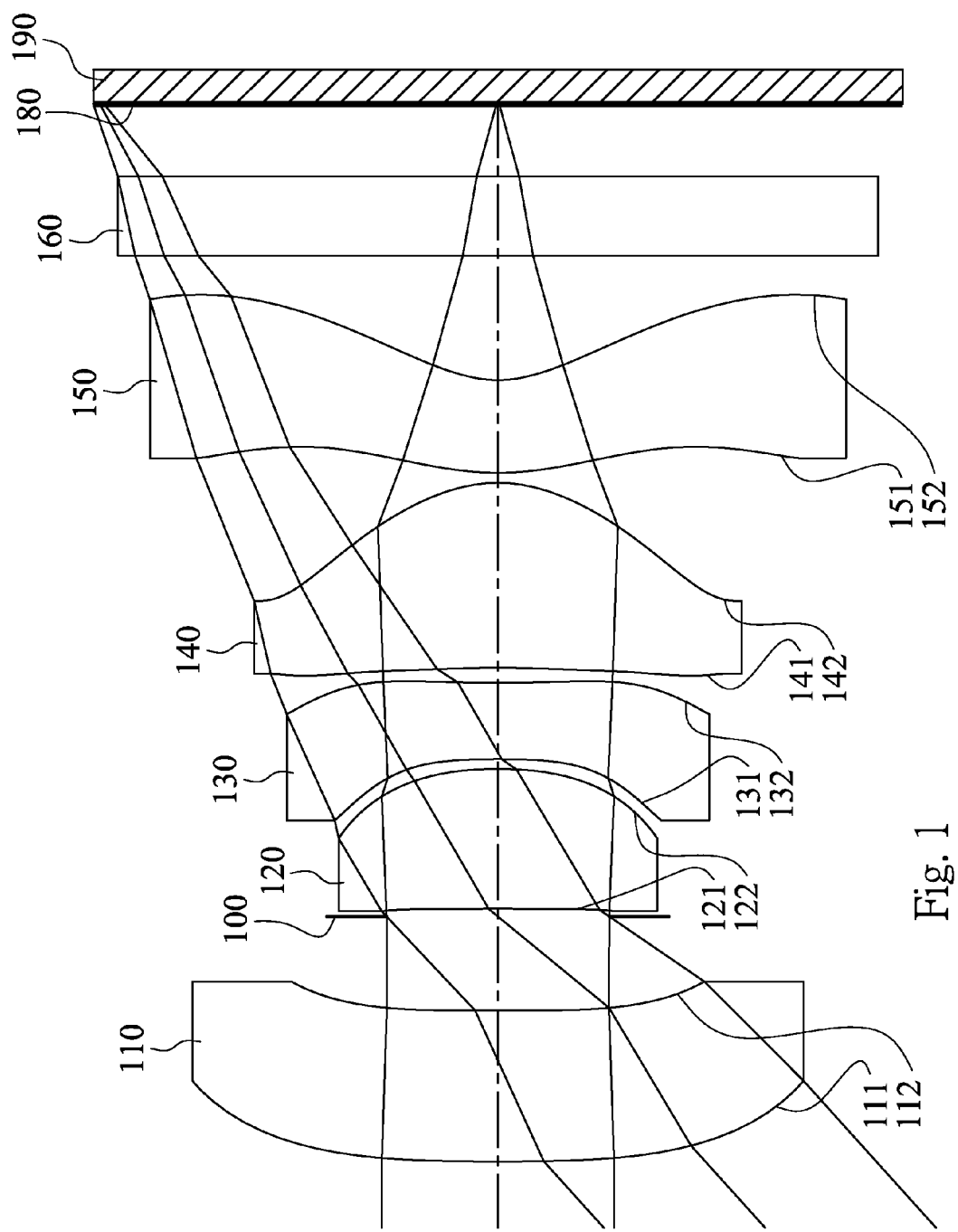
FIG. 1 is a schematic view of an image capturing device according to the 1st embodiment of the present disclosure.

An imaging optical system includes, in order from an object side to an image side, a first lens element, a second lens element, a third lens element, a fourth lens element and a fifth lens element, the imaging optical system has a total of five lens elements with refractive power. The imaging optical system can further include a stop disposed between the first lens element and the second lens element, such as an aperture stop.

The first lens element has an object-side surface being convex in a paraxial region thereof and an image-side surface being concave in a paraxial region thereof. Therefore, it is favorable for correcting the astigmatism of the imaging optical system.

The second lens element with positive refractive power has an image-side surface being convex in a paraxial region thereof. Therefore, it is favorable for balancing the distribution of the focal length so as to enlarge the field of view of the imaging optical system.

The third lens element with negative refractive power has an image-side surface being concave in a paraxial region thereof. Therefore, it is favorable for correcting the aberration of the imaging optical system. Furthermore, the image-side surface of the third lens element can have at least one convex shape in an off-axial region thereon. Therefore, it is favorable for effectively reducing the incident angle of off-axis onto an image sensor so as to increase the responding efficiency of the image sensor.

The fourth lens element with positive refractive power has an image-side surface being convex in a paraxial region thereof. Therefore, it is favorable for reducing the photosensitivity of the imaging optical system and effectively correcting the astigmatism.

The fifth lens element with negative refractive power can have an object-side surface being convex in a paraxial region thereof, and has an image-side surface being concave in a paraxial region thereof, wherein the image-side surface of the fifth lens element has at least one convex shape in an off-axial region thereof. Therefore, it is favorable for the principal point of the imaging optical system being positioned away from the image side and reducing a back focal length of the imaging optical system so as to maintain the compact size and correct the aberration of the off-axis effectively.

When a focal length of the first lens element is f1, and a focal length of the second lens element is f2, the following condition is satisfied: |f2/f1|<0.70. Therefore, it is favorable for balancing the distribution of the focal length so as to enlarge the field of view of the imaging optical system. Preferably, the following condition is satisfied: |f2/f1|<0.50.

When an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following condition is satisfied: 0.60<T12/(T23+T34+T45). Therefore, it is favorable for a compact space arrangement by properly adjusting the axial distances between lens elements so as to reduce a total track length of the imaging optical system characterized by large field of view and maintain the compact size thereof. Moreover, it is favorable for structure design for abutting and joining lens elements together by the compact space arrangement. As a result, it is favorable for reducing the imaging problems resulted from the tilt and decenter. Preferably, the following condition is satisfied: 1.8<T12/(T23+T34+T45). More preferably, the following condition is satisfied: 1.8<T12/(T23+T34+T45)<6.0.

When a curvature radius of an object-side surface of the second lens element is R3, and a curvature radius of the image-side surface of the second lens element is R4, the following condition is satisfied: −0.1<(R3+R4)/(R3−R4). Therefore, it is favorable for correcting the aberration of the imaging optical system by properly adjusting the surface shape of the second lens element. Preferably, the following condition is satisfied: 0.40<(R3+R4)/(R3−R4). More preferably, the following condition is satisfied: 0.60<(R3+R4)/(R3−R4)<2.0.

When a maximal field of view of the imaging optical system is FOV, the following condition is satisfied: 80 degree<FOV<110 degree. Therefore, it is favorable for enlarging the field of view so as to obtain a larger image scene.

When a focal length of the fourth lens element is f4, and a focal length of the fifth lens element is f5, the following condition is satisfied: −0.65<f4/f5<−0.20. Therefore, it is favorable for reducing the back focal length of the imaging optical system so as to maintain the compact size thereof.

When a sum of the central thicknesses of the first lens element, the second lens element, the third lens element, the fourth lens element and the fifth lens element is ΣCT, and an axial distance between the object-side surface of the first lens element and the image-side surface of the fifth lens element is Td, the following condition is satisfied: 0.75<ΣCT/Td<0.90. Therefore, it is favorable for the moldability and homogeneity of lens elements, so that the compact size of the imaging optical system can be maintained.

When an Abbe number of the first lens element is V1, and an Abbe number of the second lens element is V2, the following condition is satisfied: 0.20<V1/V2<0.50. Therefore, it is favorable for correcting the chromatic aberration of the imaging optical system so as to improve the image quality.

When a focal length of the imaging optical system is f, and a curvature radius of the image-side surface of the fifth lens element is R10, the following condition is satisfied: 0.20<R10/f<0.50. Therefore, it is favorable for the principal point of the imaging optical system being positioned away from the image side so as to reduce the back focal length and maintain the compact size thereof.

When the focal length of the second lens element is f2, and the focal length of the fourth lens element is f4, the following condition is satisfied: 1.25<f2/f4<3.0. Therefore, it is favorable for reducing the photosensitivity of the imaging optical system.

When an axial distance between the object-side surface of the first lens element and an image plane is TTL, and a maximum image height of the imaging optical system is ImgH, the following condition is satisfied: TTL/ImgH<3.0. Therefore, it is favorable for reducing the total track length of the imaging optical system so as to maintain the compact size thereof.

According to the imaging optical system of the present disclosure, the lens elements thereof can be made of plastic or glass material. When the lens elements are made of plastic material, the manufacturing cost can be effectively reduced. When the lens elements are made of glass material, the distribution of the refractive power of the imaging optical system may be more flexible to design. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the imaging optical system can also be reduced.

According to the imaging optical system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the imaging optical system of the present disclosure, an aperture stop can be configured as a front stop or a middle stop. A front stop disposed between an imaged object and the first lens element can provide a longer distance between an exit pupil of the imaging optical system and the image plane and thereby improves the image-sensing efficiency of an image sensor. A middle stop disposed between the first lens element and the image plane is favorable for enlarging the field of view of the imaging optical system and thereby provides a wider field of view for the same.

According to the imaging optical system of the present disclosure, the imaging optical system can include at least one stop, such as an aperture stop, a glare stop or a field stop. The glare stop or the field stop is for eliminating the stray light and thereby improving the image resolution thereof.

According to the imaging optical system of the present disclosure, the imaging optical system can be optionally applied to moving focus optical systems. Furthermore, the imaging optical system is featured with good correction ability and high image quality, and can be applied to 3D (three-dimensional) image capturing applications, in products such as digital cameras, mobile devices, digital tablets, smart TVs, network monitoring devices, motion sensing input devices, driving recorders, rear view camera systems, wearable devices and other electronic imaging products.

According to the present disclosure, an image capturing device is provided. The image capturing device includes the aforementioned imaging optical system according to the present disclosure and an image sensor, wherein the image sensor is located on or near an image plane of the aforementioned imaging optical system. In the imaging optical system of the image capturing device, it is favorable for keeping a compact space arrangement by properly adjusting the axial distances between lens elements so as to reduce the total track length of the imaging optical system characterized by large field of view and maintain the compact size thereof. Moreover, it is favorable for abutting and joining lens elements together due to the compact space arrangement for reducing worse imaging problems resulted from the tilt and decenter. Preferably, the image capturing device can further include a barrel member, a holder member or a combination thereof.

According to the present disclosure, a mobile terminal is provided, wherein the mobile terminal includes the aforementioned image capturing device. Therefore, it is favorable for keeping a compact size, abutting and joining lens elements together so as to avoid imaging problems resulted from the tilt and decenter. Preferably, the mobile terminal can further include but not limited to a control unit, a display, a storage unit, a random access memory unit (RAM) or a combination thereof.

According to the above description of the present disclosure, the following 1st-12th specific embodiments are provided for further explanation.

1st Embodiment

Figure 2:
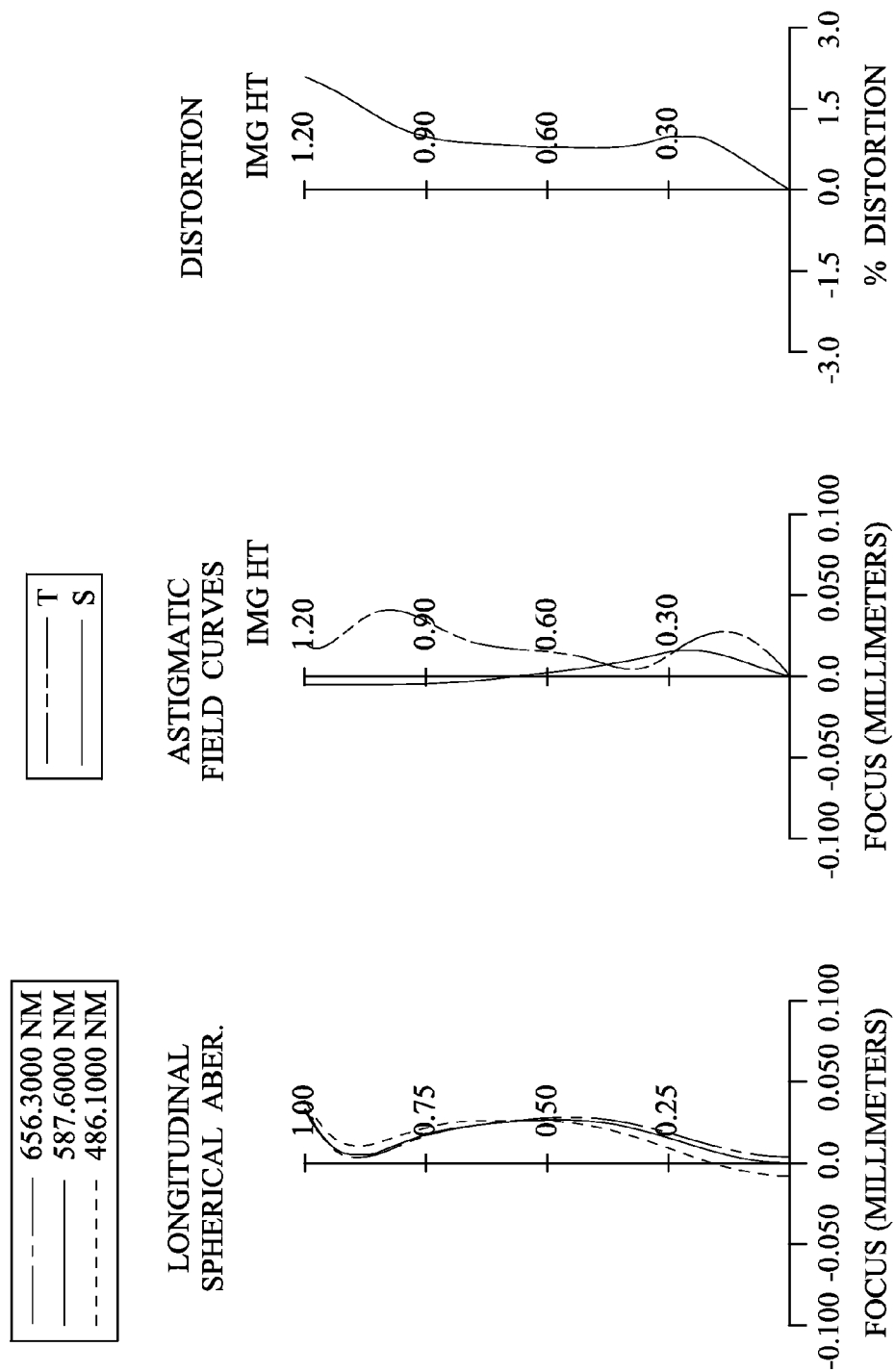
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows, in order from left to right, spherical aberration curves, astigmatic field curves and a distortion curve of the image capturing device according to the 1st embodiment.

In FIG. 1, the image capturing device includes the imaging optical system (its reference numeral is omitted) of the present disclosure and an image sensor 190. The imaging optical system includes, in order from an object side to an image side, a first lens element 110, an aperture stop 100, a second lens element 120, a third lens element 130, a fourth lens element 140, a fifth lens element 150, an IR-cut filter 160 and an image plane 180. The image sensor 190 is located on or near the image plane 180 of the imaging optical system. The imaging optical system has a total of five lens elements (110-150) with refractive power.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric. Furthermore, the image-side surface 132 of the third lens element 130 has at least one convex shape in an off-axial region thereon.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. Furthermore, the image-side surface 152 of the fifth lens element 150 has at least one convex shape in an off-axial region thereon.

The IR-cut filter 160 is made of glass material and located between the fifth lens element 150 and the image plane 180, and will not affect the focal length of the imaging optical system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging optical system of the image capturing device according to the 1st embodiment, when a focal length of the imaging optical system is f, an f-number of the imaging optical system is Fno, and half of a maximal field of view of the imaging optical system is HFOV, these parameters have the following values: f=1.29 mm; Fno=1.85; and HFOV=42.0 degrees.

In the imaging optical system of the image capturing device according to the 1st embodiment, when the maximal field of view of the imaging optical system is FOV, the following condition is satisfied: FOV=84.0 degrees.

In the imaging optical system of the image capturing device according to the 1st embodiment, when an Abbe number of the first lens element 110 is V1, and an Abbe number of the second lens element 120 is V2, the following condition is satisfied: V1/V2=0.39.

In the imaging optical system of the image capturing device according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, and an axial distance between the fourth lens element 140 and the fifth lens element 150 is T45, the following condition is satisfied: T12/(T23+T34+T45)=2.90.

In the imaging optical system of the image capturing device according to the 1st embodiment, when a sum of the central thicknesses of the first lens element 110, the second lens element 120, the third lens element 130, the fourth lens element 140 and the fifth lens element 150 is ΣCT, and an axial distance between the object-side surface 111 of the first lens element 110 and the image-side surface 152 of the fifth lens element 150 is Td, the following condition is satisfied: ΣCT/Td=0.82.

In the imaging optical system of the image capturing device according to the 1st embodiment, when an axial distance between the object-side surface 111 of the first lens element 110 and the image plane 180 is TTL, and a maximum image height of the imaging optical system (half of a diagonal length of an effective photosensitive area of the image sensor 190) is ImgH, the following condition is satisfied: TTL/ImgH=2.59.

In the imaging optical system of the image capturing device according to the 1st embodiment, when a curvature radius of the object-side surface 121 of the second lens element 120 is R3, and a curvature radius of the image-side surface 122 of the second lens element 120 is R4, the following condition is satisfied: (R3+R4)/(R3−R4)=1.05.

In the imaging optical system of the image capturing device according to the 1st embodiment, when the focal length of the imaging optical system is f, and a curvature radius of the image-side surface 152 of the fifth lens element 150 is R10, the following condition is satisfied: R10/f=0.27.

In the imaging optical system of the image capturing device according to the 1st embodiment, when a focal length of the first lens element 110 is f1, and a focal length of the second lens element 120 is f2, the following condition is satisfied: |f2/f1|=0.15.

In the imaging optical system of the image capturing device according to the 1st embodiment, when the focal length of the second lens element 120 is f2, and a focal length of the fourth lens element 140 is f4, the following condition is satisfied: f2/f4=1.73.

In the imaging optical system of the image capturing device according to the 1st embodiment, when the focal length of the fourth lens element 140 is f4, and a focal length of the fifth lens element 150 is f5, the following condition is satisfied: f4/f5=−0.53.

The detailed optical data of the 1st embodiment are shown in Table 1 and the aspheric surface data are shown in Table 2 below.

surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
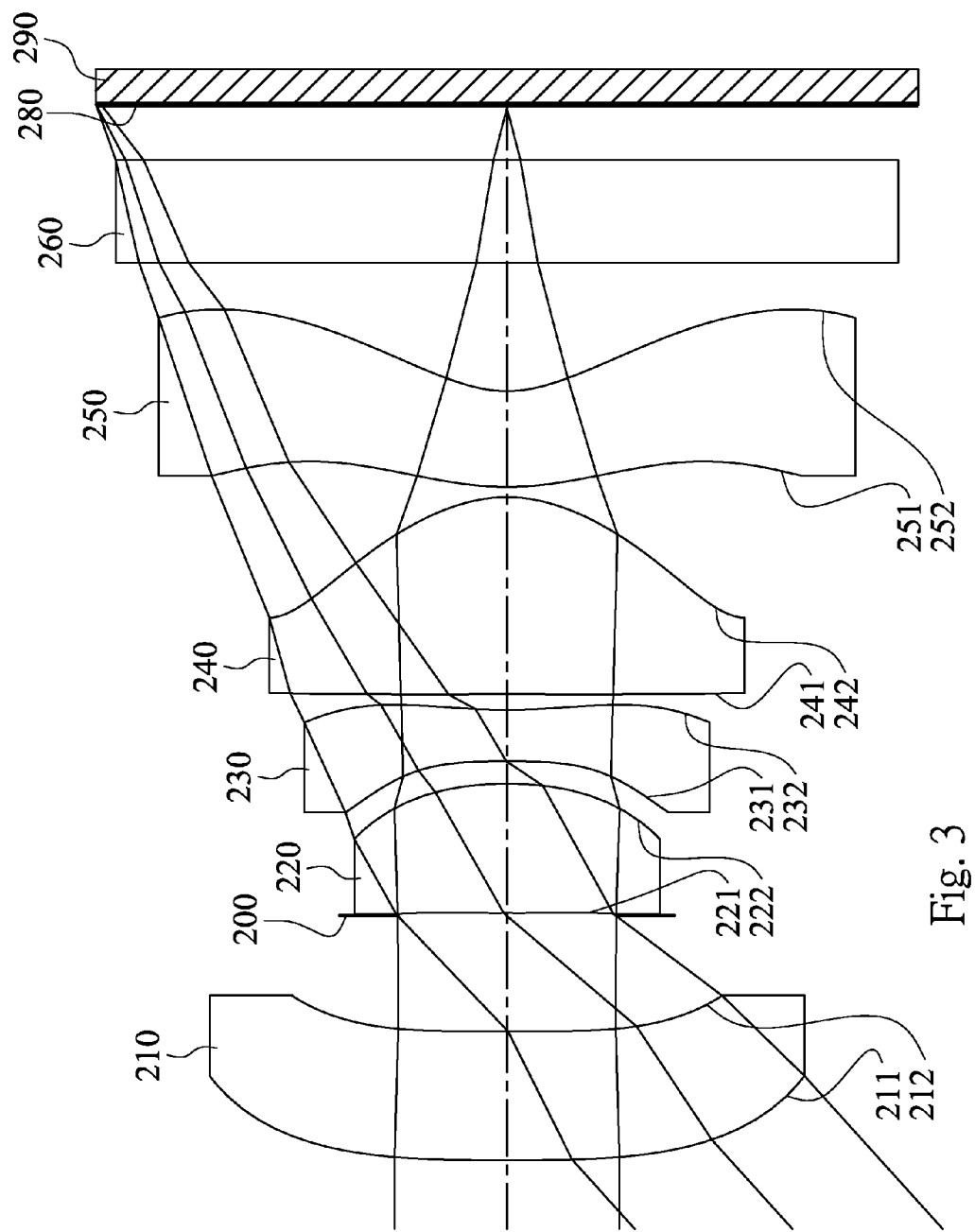
FIG. 3 is a schematic view of an image capturing device according to the 2nd embodiment of the present disclosure.

FIG. 3 is a schematic view of an image capturing device according to the 2nd embodiment of the present disclosure.

TABLE 1

1st Embodiment
f = 1.29 mm, Fno = 1.85, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.543 | ASP | 0.456 | Plastic | 1.650 | 21.5 | 15.08 |
| 2 | | 64.803 | ASP | 0.284 | | | | |
| 3 | Ape. Stop | Plano | | 0.023 | | | | |
| 4 | Lens 2 | −49.467 | ASP | 0.422 | Plastic | 1.544 | 55.9 | 2.37 |
| 5 | | −1.260 | ASP | 0.030 | | | | |
| 6 | Lens 3 | −3.462 | ASP | 0.230 | Plastic | 1.650 | 21.5 | −2.76 |
| 7 | | 3.823 | ASP | 0.046 | | | | |
| 8 | Lens 4 | −2.781 | ASP | 0.558 | Plastic | 1.544 | 55.9 | 0.88 |
| 9 | | −0.436 | ASP | 0.030 | | | | |
| 10 | Lens 5 | 0.847 | ASP | 0.280 | Plastic | 1.535 | 55.7 | −1.42 |
| 11 | | 0.355 | ASP | 0.375 | | | | |
| 12 | IR-cut filter | Plano | | 0.240 | Glass | 1.517 | 64.2 | — |
| 13 | | Plano | | 0.218 | | | | |
| 14 | Image | Plano | | — | | | | |

Note:
Reference wavelength is 587.6 nm (d-line).

TABLE 2

Aspheric Coefficients

| | Surface # | | | | |
|---|---|---|---|---|---|
| | 1 | 2 | 4 | 5 | 6 |
| k = | −5.8653E+01 | −8.5000E+01 | 7.7712E+00 | −3.7856E−01 | 4.5014E+01 |
| A4 = | 2.8101E−01 | 5.5982E−01 | −2.4187E−01 | −3.1985E+00 | −4.2265E+00 |
| A6 = | −8.0525E−02 | 2.0965E+00 | 6.8993E+00 | 1.2334E+01 | 1.1830E+01 |
| A8 = | −1.1850E−01 | −3.1239E+01 | −3.3457E+01 | −6.5010E+01 | −3.2274E+01 |
| A10 = | 6.2503E−01 | 1.9255E+02 | −3.5770E+03 | 7.2133E+02 | 2.1256E+02 |
| A12 = | −7.5196E−01 | −6.1294E+02 | 7.0894E+04 | −6.8000E+03 | −2.3111E+03 |
| A14 = | 3.7407E−01 | 1.0001E+03 | −5.1847E+05 | 2.8677E+04 | 1.1089E+04 |
| A16 = | −1.5180E−02 | −6.6089E+02 | 1.3086E+06 | −4.4482E+04 | −1.6148E+04 |

| | Surface # | | | | |
|---|---|---|---|---|---|
| | 7 | 8 | 9 | 10 | 11 |
| k = | −9.0000E+01 | 1.2713E+01 | −4.0772E+00 | −8.1252E+00 | −3.6318E+00 |
| A4 = | −4.4750E−01 | 1.6254E+00 | −2.3487E+00 | −5.6578E−01 | −6.2529E−01 |
| A6 = | −2.9275E+00 | −8.1112E+00 | 1.1681E+01 | 7.0502E−01 | 1.1961E+00 |
| A8 = | 5.5575E+00 | 1.0036E+01 | −4.2536E+01 | −2.3178E+00 | −2.3185E+00 |
| A10 = | −1.1157E+00 | 5.0063E+01 | 9.5090E+01 | 6.3110E+00 | 3.2900E+00 |
| A12 = | 9.8157E−02 | −1.8604E+02 | −9.8130E+01 | −9.0817E+00 | −2.8967E+00 |
| A14 = | 8.7363E−02 | 2.4814E+02 | 3.5965E+01 | 6.7125E+00 | 1.3805E+00 |
| A16 = | −2.0845E+00 | −1.2798E+02 | −1.1102E+00 | −1.9986E+00 | −2.7084E−01 |

Figure 4:
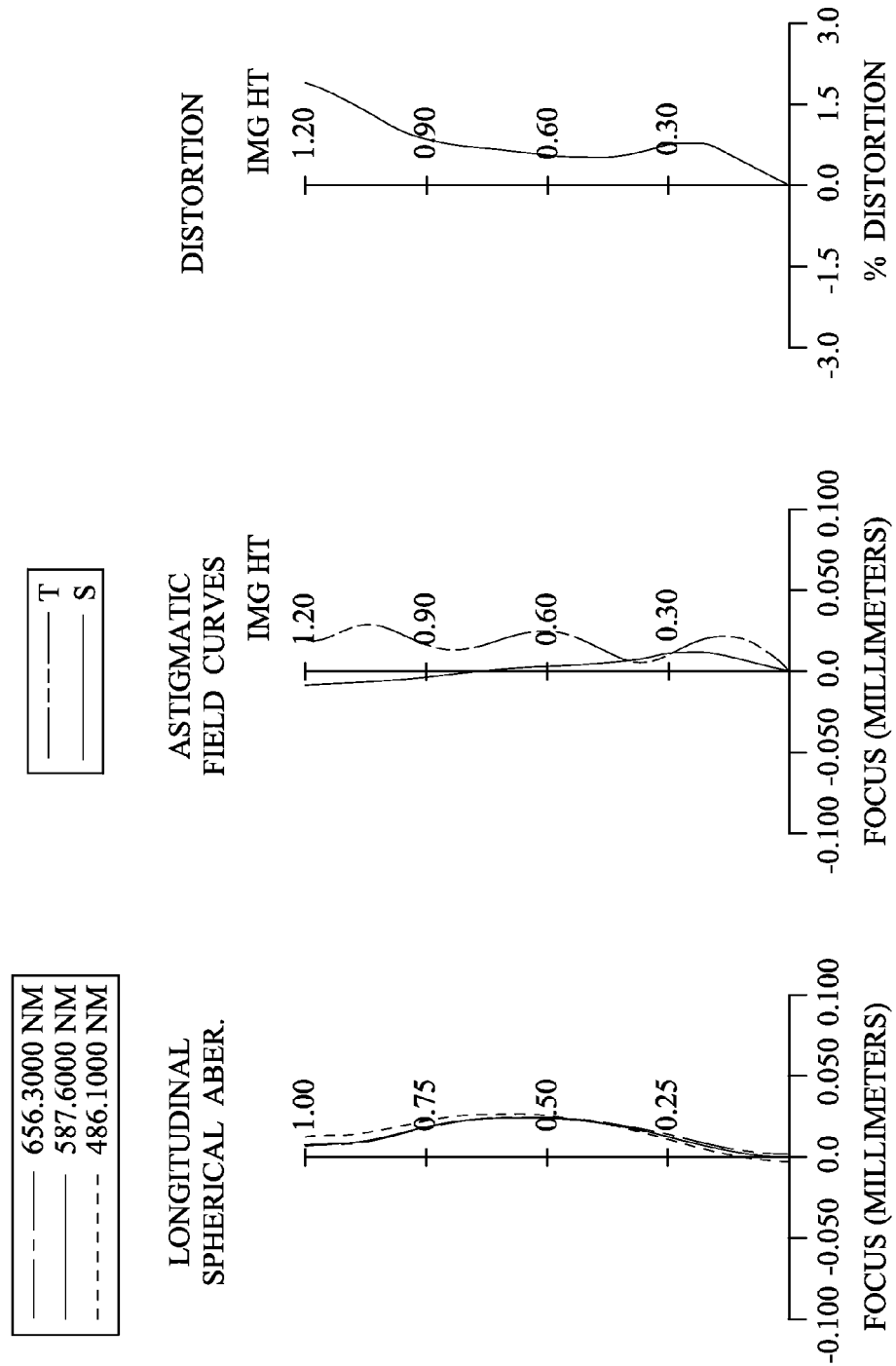
FIG. 4 shows spherical aberration curves, astigmatic field curves and a distortion curve of the image capturing device according to the 2nd embodiment.

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric FIG. 4 shows, in order from left to right, spherical aberration curves, astigmatic field curves and a distortion curve of the image capturing device according to the 2nd embodiment.

In FIG. 3, the image capturing device includes the imaging optical system (its reference numeral is omitted) of the present disclosure and an image sensor 290. The imaging optical system includes, in order from an object side to an image side, a first lens element 210, an aperture stop 200, a second lens element 220, a third lens element 230, a fourth lens element 240, a fifth lens element 250, an IR-cut filter 260 and an image plane 280. The image sensor 290 is located on or near the image plane 280 of the imaging optical system. The imaging optical system has a total of five lens elements (210-250) with refractive power.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric. Furthermore, the image-side surface 232 of the third lens element 230 has at least one convex shape in an off-axial region thereon.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. Furthermore, the image-side surface 252 of the fifth lens element 250 has at least one convex shape in an off-axial region thereon.

The IR-cut filter 260 is made of glass material and located between the fifth lens element 250 and the image plane 280, and will not affect the focal length of the imaging optical system.

The detailed optical data of the 2nd embodiment are shown in Table 3 and the aspheric surface data are shown in Table 4 below.

TABLE 3

2nd Embodiment
f = 1.29 mm, Fno = 1.97, HFOV = 42.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.909 | ASP | 0.377 | Plastic | 1.544 | 55.9 | 20.19 |
| 2 | | 46.419 | ASP | 0.338 | | | | |
| 3 | Ape. Stop | Plano | | 0.008 | | | | |
| 4 | Lens 2 | 12.561 | ASP | 0.378 | Plastic | 1.544 | 55.9 | 1.82 |
| 5 | | −1.065 | ASP | 0.066 | | | | |
| 6 | Lens 3 | −3.955 | ASP | 0.150 | Plastic | 1.639 | 23.5 | −1.73 |
| 7 | | 1.557 | ASP | 0.047 | | | | |
| 8 | Lens 4 | −4.290 | ASP | 0.575 | Plastic | 1.544 | 55.9 | 0.82 |
| 9 | | −0.425 | ASP | 0.030 | | | | |
| 10 | Lens 5 | 0.877 | ASP | 0.280 | Plastic | 1.535 | 55.7 | −1.39 |
| 11 | | 0.357 | ASP | 0.375 | | | | |
| 12 | IR-cut filter | Plano | | 0.300 | Glass | 1.517 | 64.2 | — |
| 13 | | Plano | | 0.162 | | | | |
| 14 | Image | Plano | | — | | | | |

Note:
Reference wavelength is 587.6 nm (d-line).

TABLE 4

Aspheric Coefficients

| | Surface # | | | | |
|---|---|---|---|---|---|
| | 1 | 2 | 4 | 5 | 6 |
| k = | 6.1554E+01 | 9.0000E+01 | 7.7712E+00 | −2.7320E+00 | 4.5014E+01 |
| A4 = | 3.3339E−01 | 7.2362E−01 | −6.5889E−01 | −2.9914E+00 | −5.8772E+00 |
| A6 = | −1.0947E−01 | 1.0321E−02 | 2.0026E+01 | 2.8465E+01 | 4.4935E+01 |
| A8 = | −9.1547E−02 | −8.3536E+00 | −5.9105E+02 | −4.3556E+02 | −4.7183E+02 |
| A10 = | 6.6984E−01 | 5.5731E+01 | 7.9877E+03 | 4.4840E+03 | 3.8366E+03 |
| A12 = | −7.1071E−01 | −1.5856E+02 | −5.5871E+04 | −2.7864E+04 | −1.8843E+04 |
| A14 = | 3.8784E−01 | 2.2502E+02 | 1.6602E+05 | 9.3271E+04 | 5.1491E+04 |
| A16 = | −4.0866E−02 | −1.3609E+02 | −1.0036E+05 | −1.2947E+05 | −5.9571E+04 |

TABLE 4-continued

Aspheric Coefficients

| | Surface # | | | | |
|---|---|---|---|---|---|
| | 7 | 8 | 9 | 10 | 11 |
| k = | −7.4563E+01 | 1.3947E+01 | −4.0076E+00 | −7.7352E+00 | −3.7238E+00 |
| A4 = | −4.6319E−01 | 1.7464E+00 | −2.3657E+00 | −5.9616E−01 | −6.4353E−01 |
| A6 = | −2.2086E+00 | −8.5015E+00 | 1.1635E+01 | 6.8964E−01 | 1.1964E+00 |
| A8 = | 5.1258E+00 | 9.6284E+00 | −4.2412E+01 | −2.3180E+00 | −2.3234E+00 |
| A10 = | −2.4781E+00 | 4.9798E+01 | 9.5400E+01 | 6.3188E+00 | 3.2857E+00 |
| A12 = | 1.0313E−01 | −1.8619E+02 | −9.7813E+01 | −9.0720E+00 | −2.8982E+00 |
| A14 = | 8.7363E−02 | 2.4901E+02 | 3.5946E+01 | 6.7183E+00 | 1.3816E+00 |
| A16 = | −2.0845E+00 | −1.2798E+02 | −2.1978E+00 | −1.9990E+00 | −2.6867E−01 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.29 | TTL/ImgH | 2.49 |
| Fno | 1.97 | (R3 + R4)/(R3 − R4) | 0.84 |
| HFOV (deg.) | 42.1 | R10/f | 0.28 |
| FOV (deg.) | 84.2 | |f2/f1| | 0.09 |
| V1/V2 | 1.00 | f2/f4 | 2.22 |
| T12/(T23 + T34 + T45) | 2.42 | f4/f5 | −0.59 |
| ΣCT/Td | 0.78 | | |

3rd Embodiment

Figure 5:
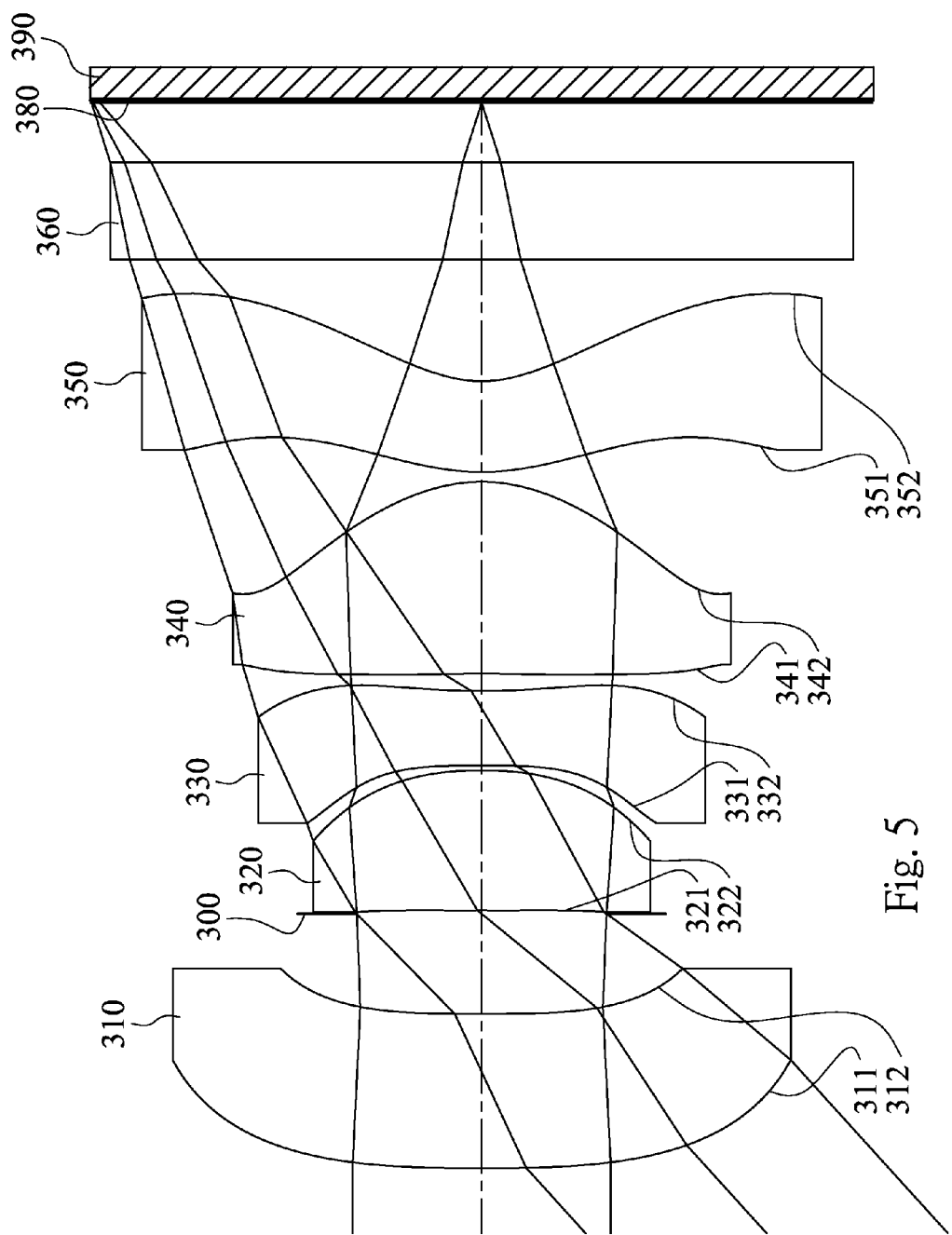
FIG. 5 is a schematic view of an image capturing device according to the 3rd embodiment of the present disclosure.
Figure 6:
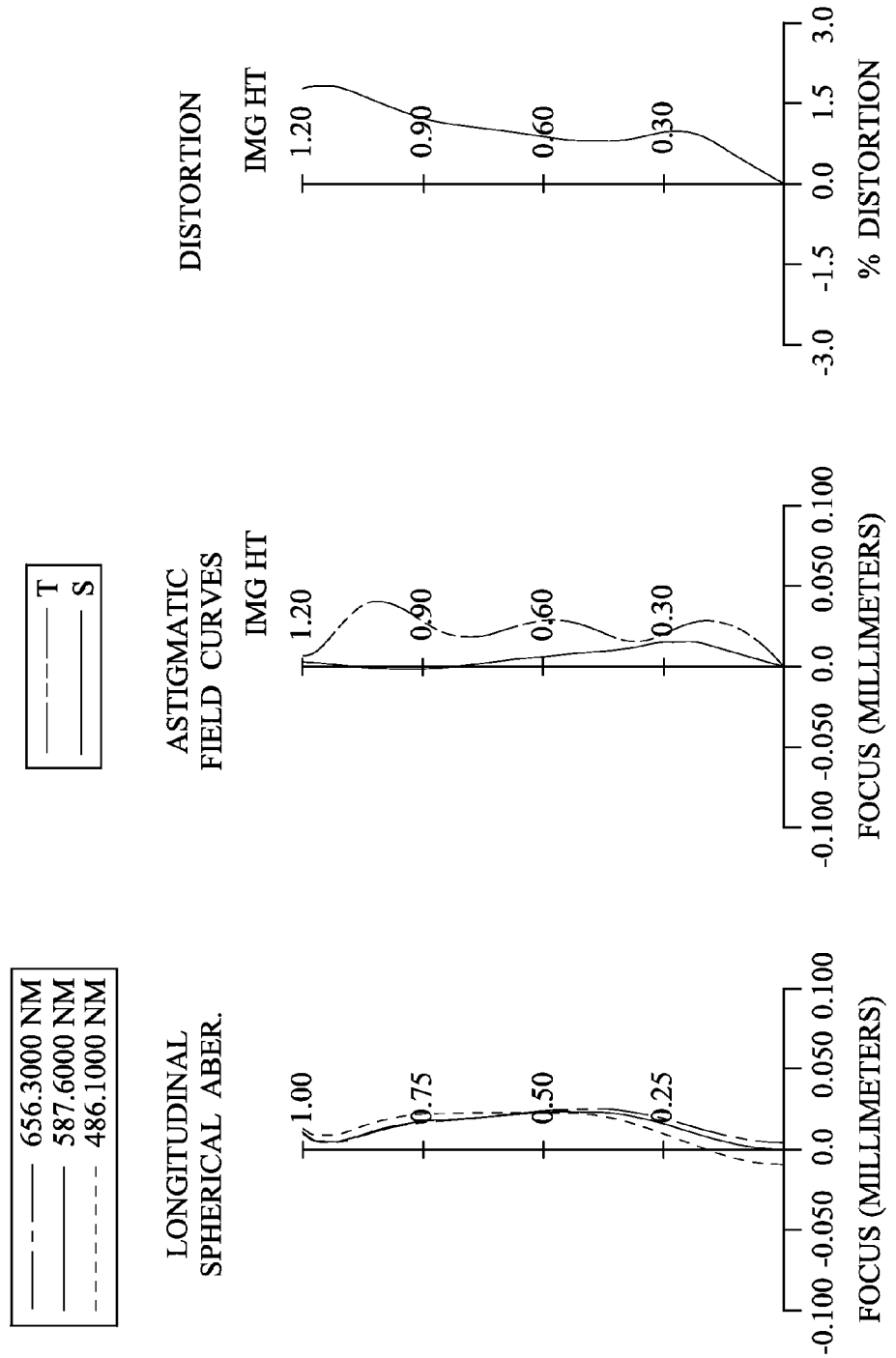
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment.

In FIG. 5, the image capturing device includes the imaging optical system (its reference numeral is omitted) of the present disclosure and an image sensor 390. The imaging optical system includes, in order from an object side to an image side, a first lens element 310, an aperture stop 300, a second lens element 320, a third lens element 330, a fourth lens element 340, a fifth lens element 350, an IR-cut filter 360 and an image plane 380. The image sensor 390 is located on or near the image plane 380 of the imaging optical system. The imaging optical system has a total of five lens elements (310-350) with refractive power.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric. Furthermore, the image-side surface 332 of the third lens element 330 has at least one convex shape in an off-axial region thereon.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. Furthermore, the image-side surface 352 of the fifth lens element 350 has at least one convex shape in an off-axial region thereon.

The IR-cut filter 360 is made of glass material and located between the fifth lens element 350 and the image plane 380, and will not affect the focal length of the imaging optical system.

The detailed optical data of the 3rd embodiment are shown in Table 5 and the aspheric surface data are shown in Table 6 below.

TABLE 5

3rd Embodiment
f = 1.29 mm, Fno = 1.63, HFOV = 42.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.267 | ASP | 0.476 | Plastic | 1.639 | 23.5 | 43.25 |
| 2 | | 7.865 | ASP | 0.309 | | | | |
| 3 | Ape. Stop | Plano | | 0.011 | | | | |
| 4 | Lens 2 | −74.193 | ASP | 0.431 | Plastic | 1.544 | 55.9 | 2.57 |
| 5 | | −1.375 | ASP | 0.015 | | | | |
| 6 | Lens 3 | −100.000 | ASP | 0.230 | Plastic | 1.639 | 23.5 | −3.47 |
| 7 | | 2.271 | ASP | 0.054 | | | | |
| 8 | Lens 4 | −3.229 | ASP | 0.591 | Plastic | 1.544 | 55.9 | 1.02 |
| 9 | | −0.503 | ASP | 0.030 | | | | |
| 10 | Lens 5 | 0.736 | ASP | 0.280 | Plastic | 1.544 | 55.9 | −2.03 |
| 11 | | 0.383 | ASP | 0.375 | | | | |
| 12 | IR-cut filter | Plano | | 0.300 | Glass | 1.517 | 64.2 | — |
| 13 | | Plano | | 0.190 | | | | |
| 14 | Image | Plano | | — | | | | |

Note:
Reference wavelength is 587.6 nm (d-line).

TABLE 6

Aspheric Coefficients

| | Surface # | | | | |
|---|---|---|---|---|---|
| | 1 | 2 | 4 | 5 | 6 |
| k = | −2.9497E+01 | −5.1090E+01 | −5.7050E+01 | −1.2389E+00 | 2.1746E+01 |
| A4 = | 2.7889E−01 | 7.0176E−01 | 6.5859E−02 | −4.8622E+00 | −5.6559E+00 |
| A6 = | −4.5636E−02 | −6.8116E−02 | 1.0224E+00 | 4.6295E+01 | 4.1843E+01 |
| A8 = | −1.2570E−01 | 1.1847E−01 | −4.3953E+01 | −2.9477E+02 | −2.6417E+02 |
| A10 = | 6.0131E−01 | −1.0006E+01 | 3.1146E+02 | 9.1008E+02 | 8.2570E+02 |
| A12 = | −7.2469E−01 | 6.7986E+01 | −9.8573E+02 | −1.0769E+03 | −9.1892E+02 |
| A14 = | 3.8853E−01 | −9.6252E+01 | | | |

| | Surface # | | | | |
|---|---|---|---|---|---|
| | 7 | 8 | 9 | 10 | 11 |
| k = | 4.5498E+00 | 8.2280E+00 | −4.7513E+00 | −5.2763E+00 | −3.2262E+00 |
| A4 = | −4.3452E−01 | 1.8842E+00 | −2.3406E+00 | −5.7672E−01 | −6.3131E−01 |
| A6 = | −3.0920E+00 | −8.2392E+00 | 1.1805E+01 | 6.7776E−01 | 1.1946E+00 |
| A8 = | 6.7341E+00 | 8.9443E+00 | −4.2959E+01 | −2.3428E+00 | −2.3205E+00 |
| A10 = | −4.8757E+00 | 4.8796E+01 | 9.4217E+01 | 6.2960E+00 | 3.2877E+00 |
| A12 = | −1.8327E+02 | −9.8474E+01 | −9.0838E+00 | −2.8978E+00 | |
| A14 = | 2.4925E+02 | 3.8351E+01 | 6.7223E+00 | 1.3808E+00 | |
| A16 = | −1.2763E+02 | −1.9771E+00 | −2.6959E−01 | | |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.29 | TTL/ImgH | 2.66 |
| Fno | 1.63 | (R3 + R4)/(R3 − R4) | 1.04 |
| HFOV (deg.) | 42.2 | R10/f | 0.30 |
| FOV (deg.) | 84.4 | |f2/f1| | 0.06 |

-continued

| 3rd Embodiment | | | |
|---|---|---|---|
| V1/V2 | 0.42 | f2/f4 | 2.52 |
| T12/(T23 + T34 + T45) | 3.23 | f4/f5 | −0.50 |
| ΣCT/Td | 0.83 | | |

4th Embodiment

Figure 7:
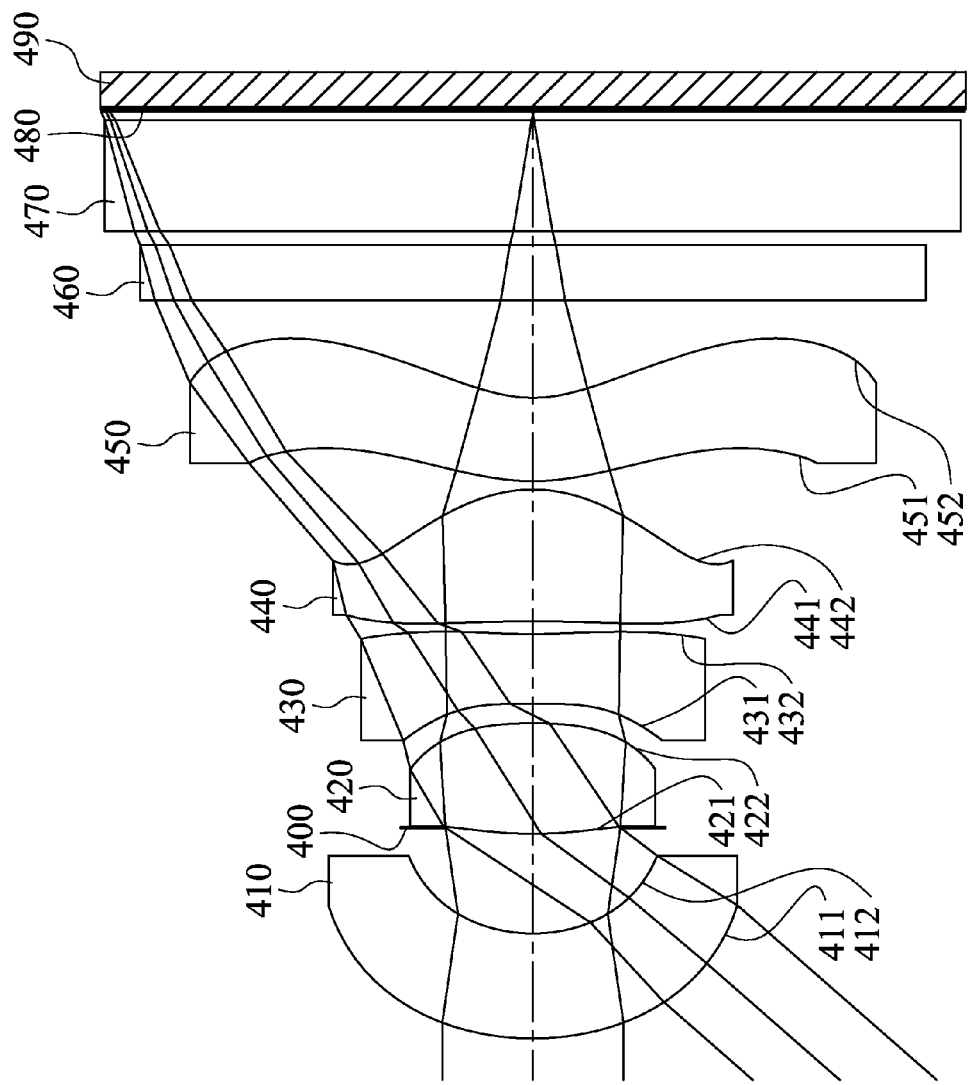
FIG. 7 is a schematic view of an image capturing device according to the 4th embodiment of the present disclosure.
Figure 8:
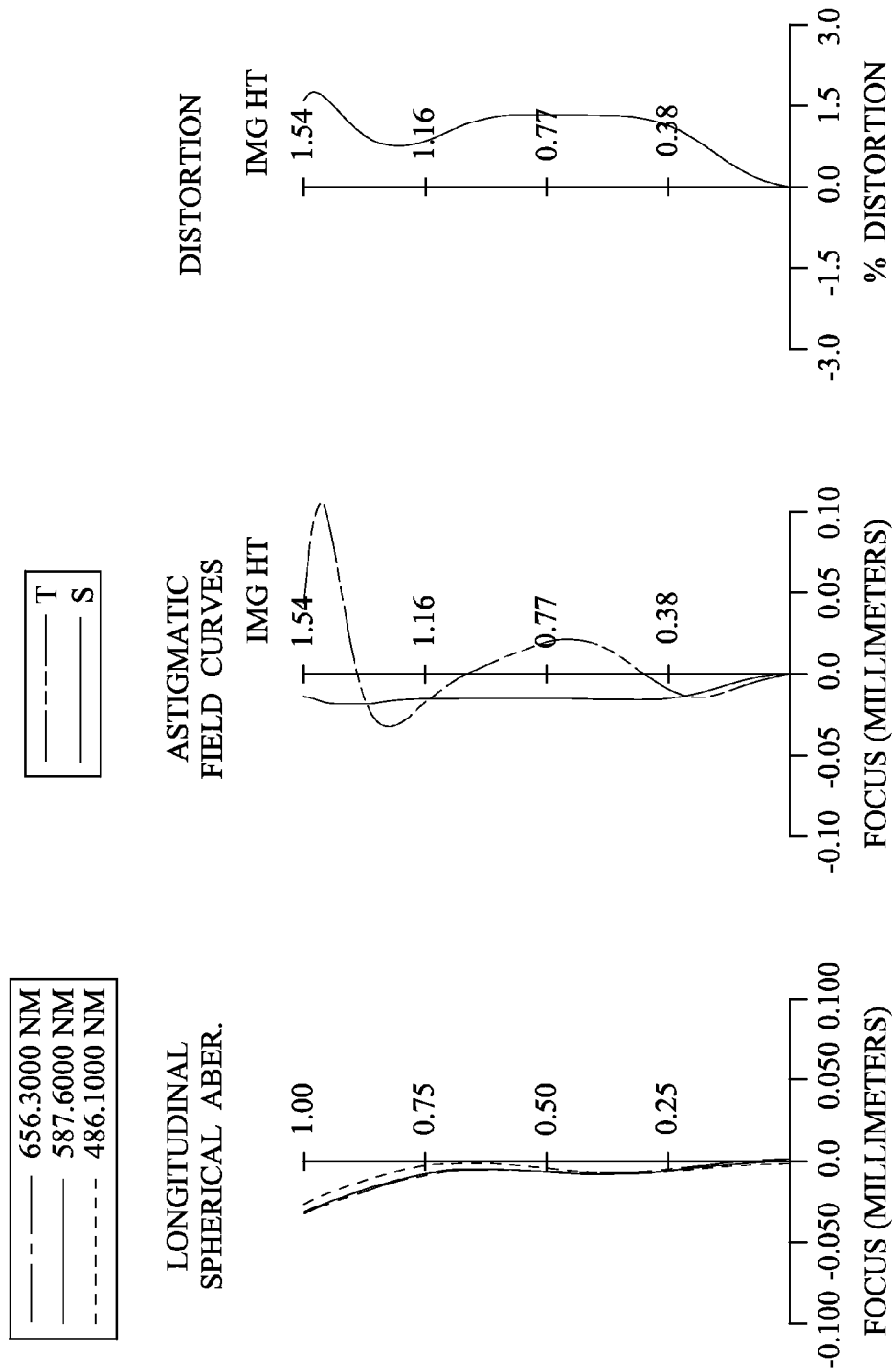
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment.

In FIG. 7, the image capturing device includes the imaging optical system (its reference numeral is omitted) of the present disclosure and an image sensor 490. The imaging optical system includes, in order from an object side to an image side, a first lens element 410, an aperture stop 400, a second lens element 420, a third lens element 430, a fourth lens element 440, a fifth lens element 450, an IR-cut filter 460, a cover glass 470 and an image plane 480. The image sensor 490 is located on or near the image plane 480 of the imaging optical system. The imaging optical system has a total of five lens elements (410-450) with refractive power.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of plastic material and has the object-side surface 431 and the image-side surface 432 being both aspheric. Furthermore, the image-side surface 432 of the third lens element 430 has at least one convex shape in an off-axial region thereon.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. Furthermore, the image-side surface 452 of the fifth lens element 450 has at least one convex shape in an off-axial region thereon.

The IR-cut filter 460 and the cover glass 470 are made of glass material and located between the fifth lens element 450 and the image plane 480 in sequence, and will not affect the focal length of the imaging optical system.

The detailed optical data of the 4th embodiment are shown in Table 7 and the aspheric surface data are shown in Table 8 below.

TABLE 7

4th Embodiment
f = 1.34 mm, Fno = 2.05, HFOV = 48.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.005 | ASP | 0.378 | Plastic | 1.634 | 23.8 | −3.18 |
| 2 | | 0.573 | ASP | 0.381 | | | | |
| 3 | Ape. Stop | Plano | | −0.022 | | | | |
| 4 | Lens 2 | 1.541 | ASP | 0.398 | Plastic | 1.544 | 55.9 | 1.52 |
| 5 | | −1.623 | ASP | 0.071 | | | | |
| 6 | Lens 3 | −5.964 | ASP | 0.250 | Plastic | 1.634 | 23.8 | −2.55 |
| 7 | | 2.258 | ASP | 0.047 | | | | |
| 8 | Lens 4 | −3.947 | ASP | 0.474 | Plastic | 1.544 | 55.9 | 1.07 |
| 9 | | −0.528 | ASP | 0.030 | | | | |
| 10 | Lens 5 | 0.828 | ASP | 0.300 | Plastic | 1.535 | 56.3 | −3.44 |
| 11 | | 0.499 | ASP | 0.350 | | | | |
| 12 | IR-cut filter | Plano | | 0.200 | Glass | 1.517 | 64.2 | — |
| 13 | | Plano | | 0.050 | | | | |
| 14 | Cover glass | Plano | | 0.400 | Glass | 1.517 | 64.2 | — |
| 15 | | Plano | | 0.040 | | | | |
| 16 | Image | Plano | | — | | | | |

Note:
Reference wavelength is 587.6 nm (d-line).

TABLE 8

Aspheric Coefficients

| | Surface # | | | | |
|---|---|---|---|---|---|
| | 1 | 2 | 4 | 5 | 6 |
| k = | 7.3534E−01 | −8.6362E+00 | −1.0226E+01 | 1.1221E+01 | 2.8401E−01 |
| A4 = | 1.3540E−01 | 5.4854E+00 | 1.5556E−01 | −2.7135E+00 | −4.3874E+00 |
| A6 = | −1.5628E−01 | −2.2658E+01 | −6.4947E+00 | 4.8651E+00 | 1.1214E+01 |
| A8 = | 1.4904E+00 | 1.0684E+02 | 4.6677E+01 | −2.5903E−01 | −2.0543E+01 |
| A10 = | −5.8527E+00 | −2.1830E+02 | −3.2981E+02 | −2.8660E+01 | 8.6116E+01 |
| A12 = | 1.0910E+01 | 5.7669E+02 | −5.8951E−06 | −3.6477E−06 | −1.7337E+02 |
| A14 = | −6.6247E+00 | −5.3064E−06 | −5.3058E−06 | −5.0071E−06 | −5.0624E−06 |
| A16 = | 1.2368E−02 | 8.0049E−08 | −3.5380E−07 | −3.5265E−07 | −3.6231E−07 |

TABLE 8-continued

Aspheric Coefficients

| Surface # | | | | | |
|---|---|---|---|---|---|
| | 7 | 8 | 9 | 10 | 11 |
| k = | −3.4716E+01 | −7.3157E+01 | −1.6811E+00 | −7.8354E−01 | −3.5596E+00 |
| A4 = | −1.3570E+00 | 5.2842E−01 | −1.4406E−01 | −1.5398E+00 | −9.1077E−01 |
| A6 = | 4.2290E+00 | −3.0216E+00 | 3.0819E−01 | 2.7935E+00 | 2.3658E+00 |
| A8 = | −6.7035E+00 | 1.8008E+01 | 1.8359E+00 | −3.0159E+00 | −4.1661E+00 |
| A10 = | 1.9774E+00 | −5.9469E+01 | −9.2120E−01 | −7.0704E−01 | 4.4397E+00 |
| A12 = | 4.4428E+00 | 1.0583E+02 | 5.7421E+00 | 5.0966E+00 | −2.8773E+00 |
| A14 = | 3.3413E−06 | −7.8205E+01 | −1.7221E+00 | −4.4663E+00 | 1.0651E+00 |
| A16 = | 1.2808E−05 | 2.1806E+00 | −1.1805E+01 | 1.2540E+00 | −1.7586E−01 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.34 | TTL/ImgH | 2.04 |
| Fno | 2.05 | (R3 + R4)/(R3 − R4) | −0.03 |
| HFOV (deg.) | 48.7 | R10/f | 0.37 |
| FOV (deg.) | 97.4 | |f2/f1| | 0.48 |
| V1/V2 | 0.43 | f2/f4 | 1.42 |
| T12/(T23 + T34 + T45) | 2.43 | f4/f5 | −0.31 |
| ΣCT/Td | 0.78 | | |

5th Embodiment

Figure 9:
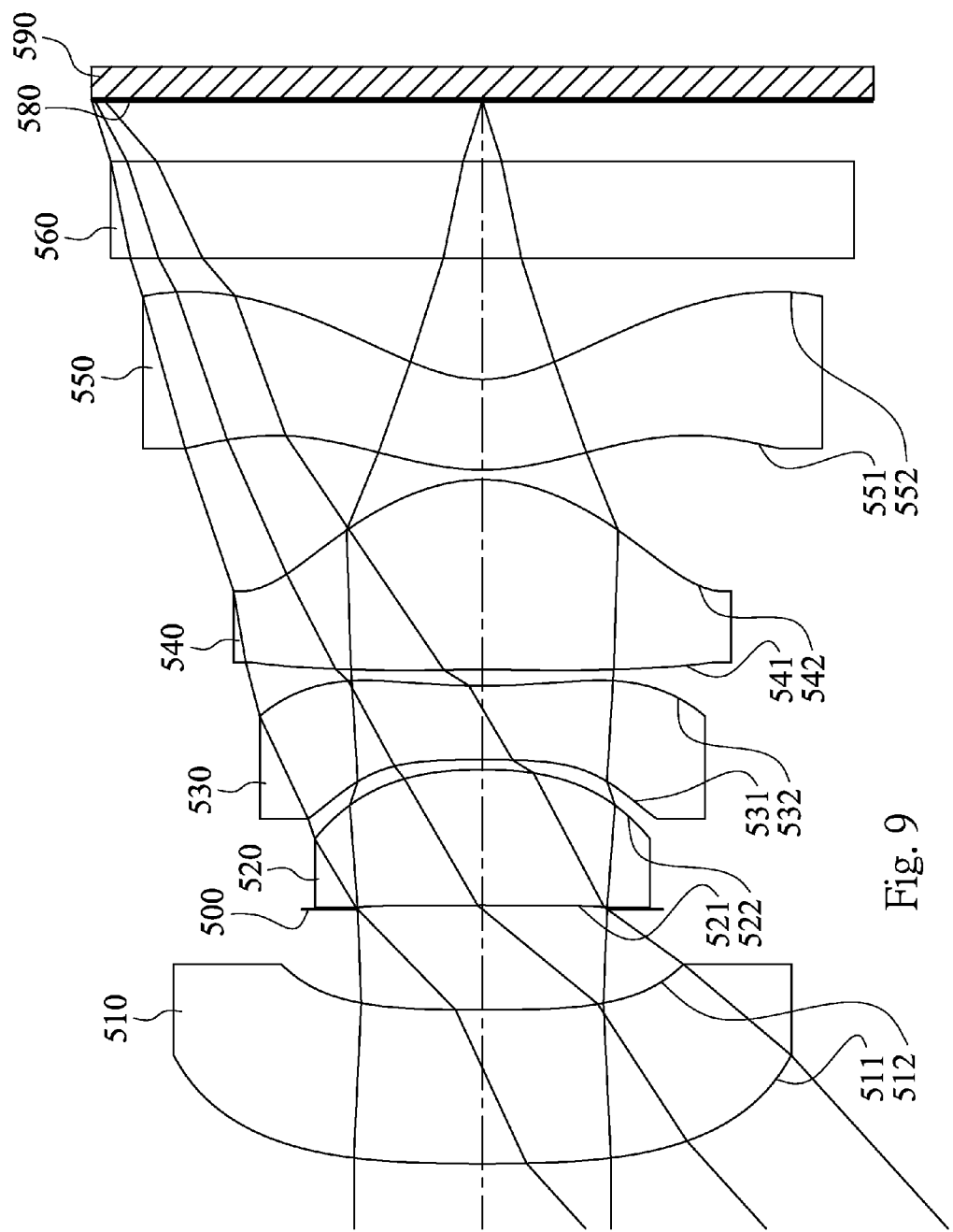
FIG. 9 is a schematic view of an image capturing device according to the 5th embodiment of the present disclosure.
Figure 10:
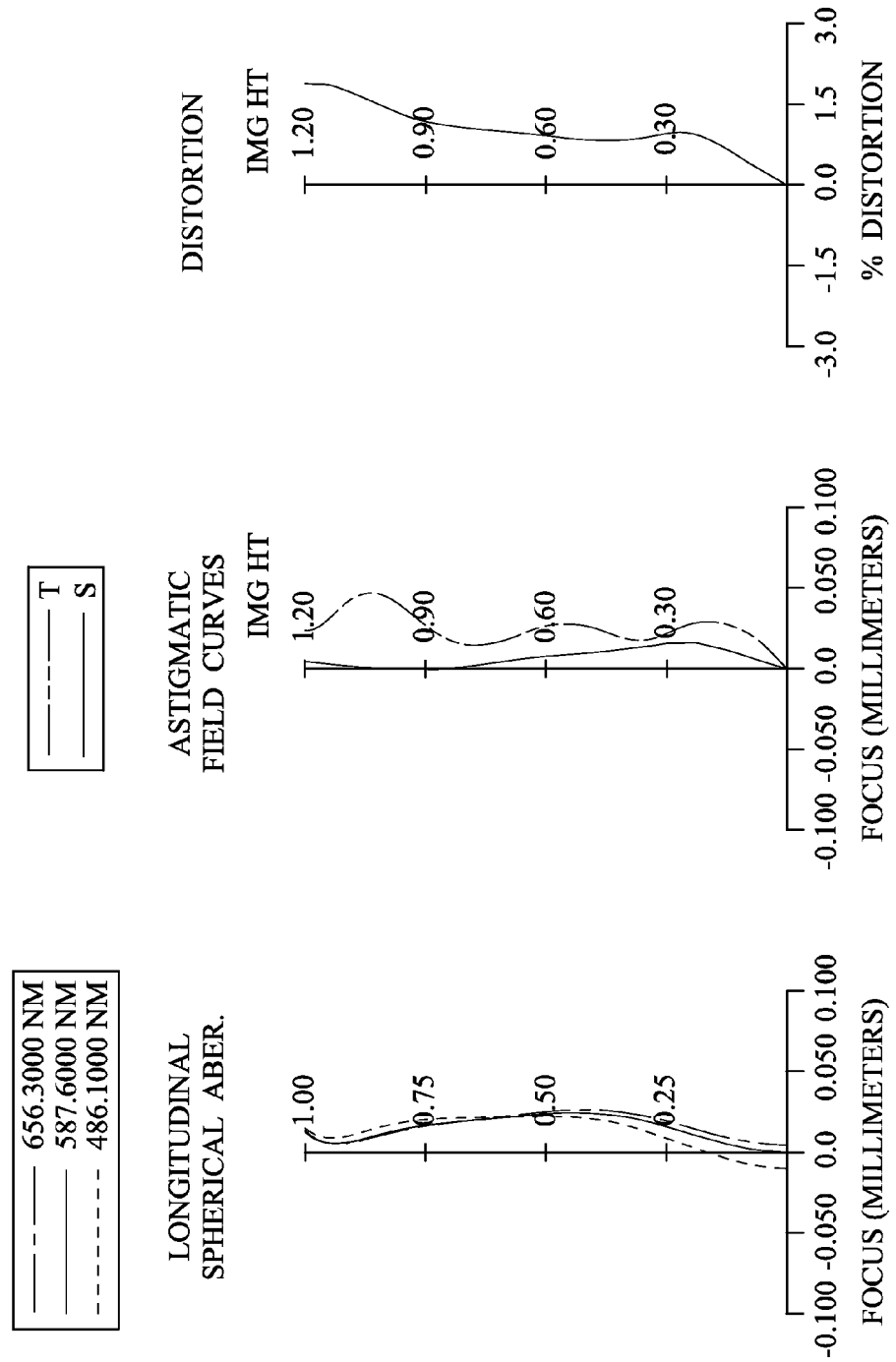
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment.

In FIG. 9, the image capturing device includes the imaging optical system (its reference numeral is omitted) of the present disclosure and an image sensor 590. The imaging optical system includes, in order from an object side to an image side, a first lens element 510, an aperture stop 500, a second lens element 520, a third lens element 530, a fourth lens element 540, a fifth lens element 550, an IR-cut filter 560 and an image plane 580. The image sensor 590 is located on or near the image plane 580 of the imaging optical system. The imaging optical system has a total of five lens elements (510-550) with refractive power.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being concave in a paraxial region thereof and an image-side surface 532 being concave in a paraxial region thereof. The third lens element 530 is made of plastic material and has the object-side surface 531 and the image-side surface 532 being both aspheric. Furthermore, the image-side surface 532 of the third lens element 530 has at least one convex shape in an off-axial region thereon.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. Furthermore, the image-side surface 552 of the fifth lens element 550 has at least one convex shape in an off-axial region thereon.

The IR-cut filter 560 is made of glass material and located between the fifth lens element 550 and the image plane 580, and will not affect the focal length of the imaging optical system.

The detailed optical data of the 5th embodiment are shown in Table 9 and the aspheric surface data are shown in Table 10 below.

TABLE 9

5th Embodiment
f = 1.29 mm, Fno = 1.63, HFOV = 42.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.644 | ASP | 0.476 | Plastic | 1.639 | 23.5 | 43.29 |
| 2 | | 8.500 | ASP | 0.312 | | | | |
| 3 | Ape. Stop | Plano | | 0.012 | | | | |
| 4 | Lens 2 | −74.100 | ASP | 0.420 | Plastic | 1.544 | 55.9 | 2.76 |
| 5 | | −1.476 | ASP | 0.030 | | | | |
| 6 | Lens 3 | −100.000 | ASP | 0.230 | Plastic | 1.639 | 23.5 | −3.70 |
| 7 | | 2.425 | ASP | 0.050 | | | | |
| 8 | Lens 4 | −3.504 | ASP | 0.588 | Plastic | 1.544 | 55.9 | 1.01 |
| 9 | | −0.503 | ASP | 0.030 | | | | |
| 10 | Lens 5 | 0.739 | ASP | 0.280 | Plastic | 1.544 | 55.9 | −2.00 |
| 11 | | 0.382 | ASP | 0.375 | | | | |
| 12 | IR-cut filter | Plano | | 0.300 | Glass | 1.517 | 64.2 | — |
| 13 | | Plano | | 0.190 | | | | |
| 14 | Image | Plano | | — | | | | |

Note:
Reference wavelength is 587.6 nm (d-line).

TABLE 10

Aspheric Coefficients

| Surface # | | | | | |
|---|---|---|---|---|---|
| | 1 | 2 | 4 | 5 | 6 |
| k = | −2.9497E+01 | −5.1090E+01 | −5.7050E+01 | −1.6163E+00 | 2.1746E+01 |
| A4 = | 2.7833E−01 | 6.9815E−01 | 4.5017E−02 | −3.6716E+00 | −4.6552E+00 |
| A6 = | −5.4856E−02 | −9.9028E−02 | 1.1354E+00 | 2.7424E+01 | 2.5805E+01 |
| A8 = | −8.9979E−02 | 3.9494E−01 | −4.8471E+01 | −1.7338E+02 | −1.6483E+02 |
| A10 = | 5.1953E−01 | −1.0902E+01 | 3.5124E+02 | 5.4649E+02 | 5.4611E+02 |
| A12 = | −6.2954E−01 | 6.9141E+01 | −1.1173E+03 | −6.7304E+02 | −6.2592E+02 |
| A14 = | 3.4389E−01 | −9.6443E+01 | | | |

| Surface # | | | | | |
|---|---|---|---|---|---|
| | 7 | 8 | 9 | 10 | 11 |
| k = | 4.5447E+00 | 9.0683E+00 | −4.8148E+00 | −5.3380E+00 | −3.2167E+00 |
| A4 = | −3.4134E−01 | 1.9630E+00 | −2.4201E+00 | −5.8775E−01 | −6.2816E−01 |
| A6 = | −3.6993E+00 | −8.7816E+00 | 1.2607E+01 | 7.4575E−01 | 1.1652E+00 |
| A8 = | 8.2475E+00 | 1.1679E+01 | −4.7144E+01 | −2.4906E+00 | −2.2350E+00 |
| A10 = | −6.3547E+00 | 3.9415E+01 | 1.0854E+02 | 6.4376E+00 | 3.1513E+00 |
| A12 = | −1.6757E+02 | −1.2300E+02 | −9.0807E+00 | −2.7699E+00 | |
| A14 = | 2.3775E+02 | 5.3508E+01 | 6.6249E+00 | 1.3188E+00 | |
| A16 = | −1.2591E+02 | −1.9314E+00 | −2.5778E−01 | | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.29 | TTL/ImgH | 2.66 |
| Fno | 1.63 | (R3 + R4)/(R3 − R4) | 1.04 |
| HFOV (deg.) | 42.1 | R10/f | 0.30 |
| FOV (deg.) | 84.2 | \|f2/f1\| | 0.06 |

-continued

| 5th Embodiment | | | |
|---|---|---|---|
| V1/V2 | 0.42 | f2/f4 | 2.73 |
| T12/(T23 + T34 + T45) | 2.95 | f4/f5 | −0.51 |
| ΣCT/Td | 0.82 | | |

6th Embodiment

Figure 11:
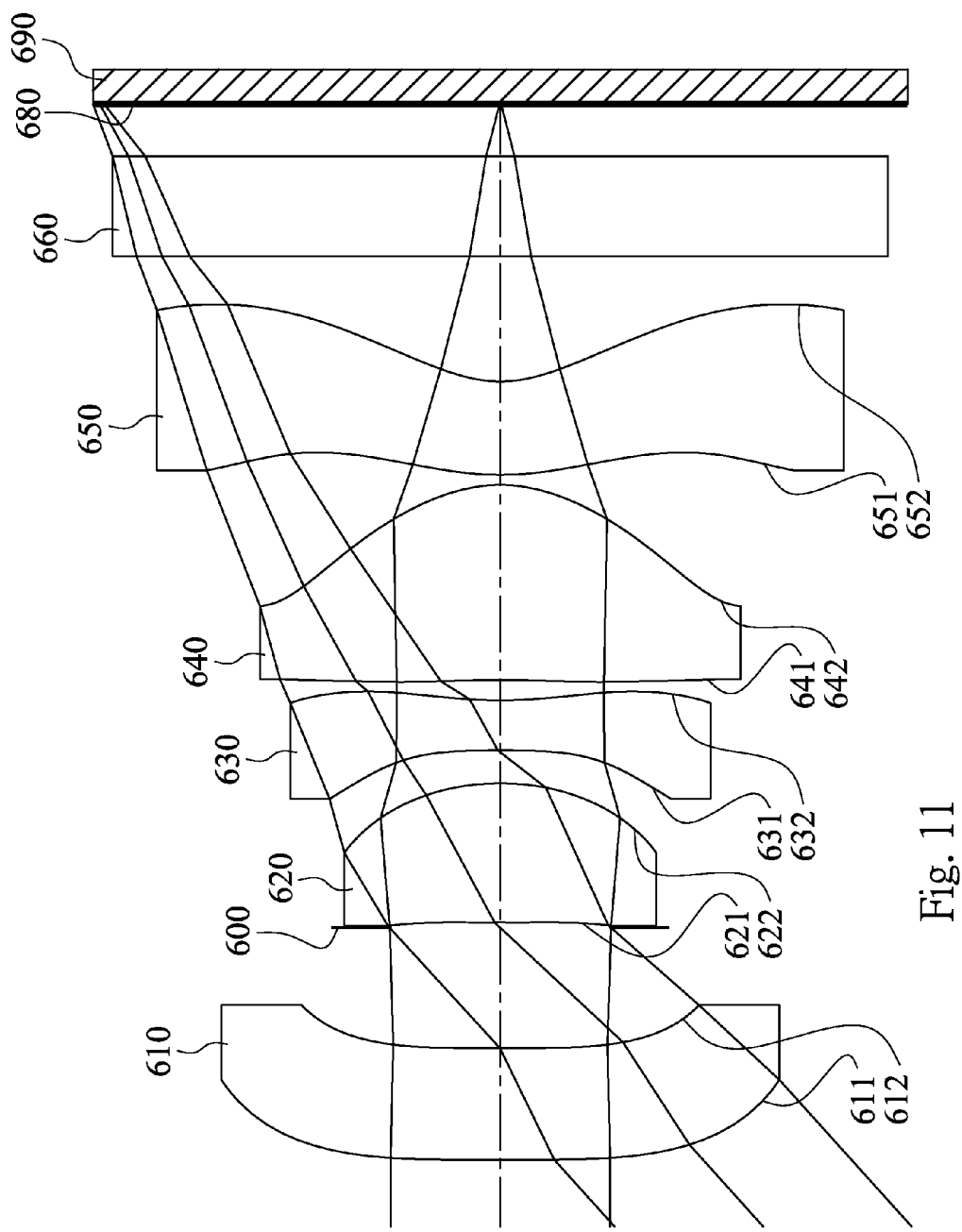
FIG. 11 is a schematic view of an image capturing device according to the 6th embodiment of the present disclosure.
Figure 12:
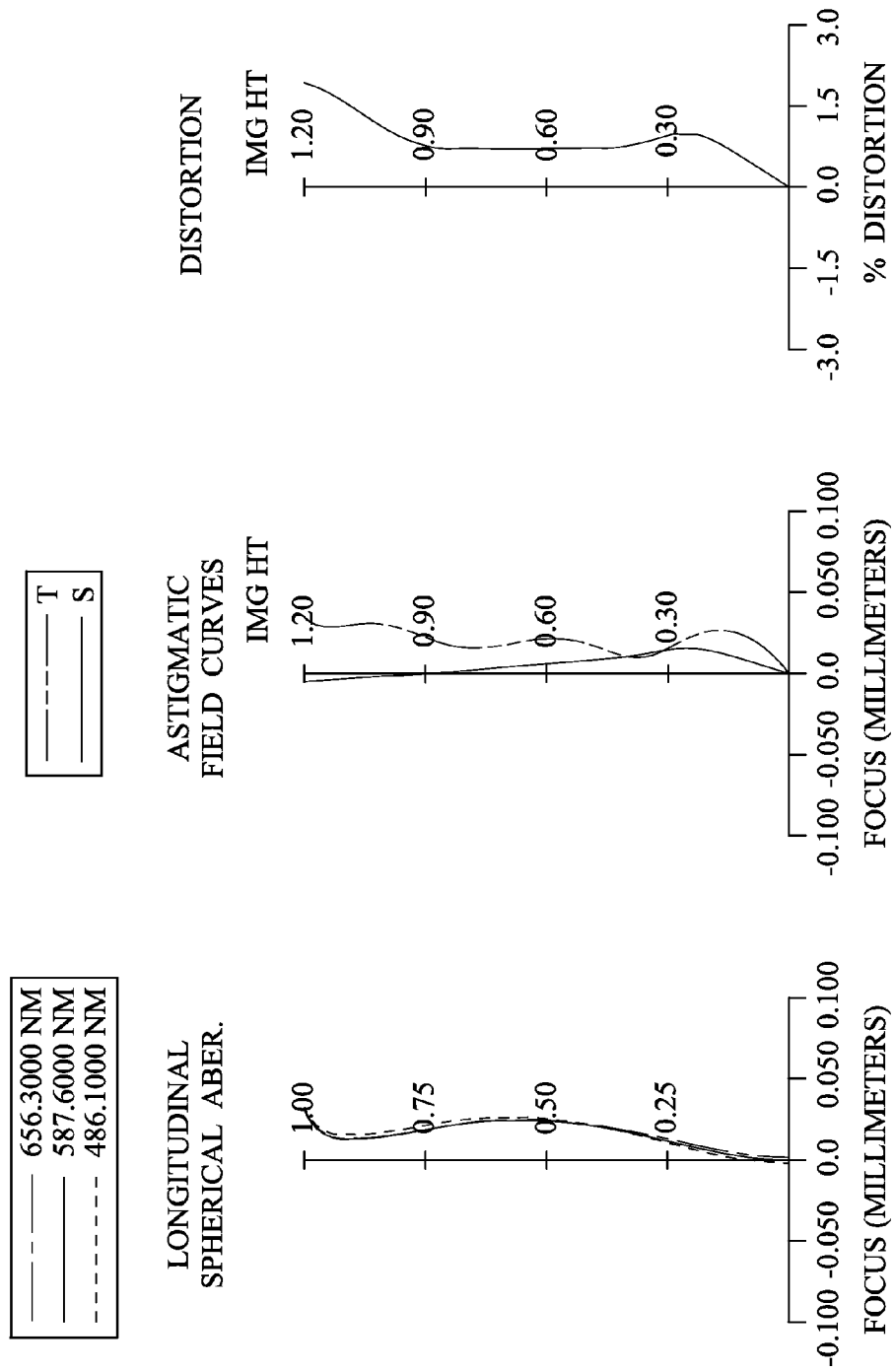
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment.

In FIG. 11, the image capturing device includes the imaging optical system (its reference numeral is omitted) of the present disclosure and an image sensor 690. The imaging optical system includes, in order from an object side to an image side, a first lens element 610, an aperture stop 600, a second lens element 620, a third lens element 630, a fourth lens element 640, a fifth lens element 650, an IR-cut filter 660 and an image plane 680. The image sensor 690 is located on or near the image plane 680 of the imaging optical system. The imaging optical system has a total of five lens elements (610-650) with refractive power.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being planar in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric. Furthermore, the image-side surface 632 of the third lens element 630 has at least one convex shape in an off-axial region thereon.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. Furthermore, the image-side surface 652 of the fifth lens element 650 has at least one convex shape in an off-axial region thereon.

The IR-cut filter 660 is made of glass material and located between the fifth lens element 650 and the image plane 680, and will not affect the focal length of the imaging optical system.

The detailed optical data of the 6th embodiment are shown in Table 11 and the aspheric surface data are shown in Table 12 below.

TABLE 11

6th Embodiment
f = 1.30 mm, Fno = 1.97, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 100.000 | ASP | 0.335 | Plastic | 1.544 | 55.9 | 20.19 |
| 2 | | 34.344 | ASP | 0.361 | | | | |
| 3 | Ape. Stop | Plano | | 0.016 | | | | |
| 4 | Lens 2 | ∞ | ASP | 0.417 | Plastic | 1.544 | 55.9 | 1.82 |
| 5 | | −0.751 | ASP | 0.099 | | | | |
| 6 | Lens 3 | −4.866 | ASP | 0.150 | Plastic | 1.639 | 23.5 | −1.73 |
| 7 | | 1.370 | ASP | 0.061 | | | | |
| 8 | Lens 4 | −2.699 | ASP | 0.585 | Plastic | 1.544 | 55.9 | 0.82 |
| 9 | | −0.444 | ASP | 0.030 | | | | |
| 10 | Lens 5 | 0.899 | ASP | 0.280 | Plastic | 1.535 | 55.7 | −1.39 |
| 11 | | 0.370 | ASP | 0.375 | | | | |
| 12 | IR-cut filter | Plano | | 0.300 | Glass | 1.517 | 64.2 | — |
| 13 | | Plano | | 0.157 | | | | |
| 14 | Image | Plano | | — | | | | |

Note:
Reference wavelength is 587.6 nm (d-line).

TABLE 12

Aspheric Coefficients

| | Surface # | | | | |
|---|---|---|---|---|---|
| | 1 | 2 | 4 | 5 | 6 |
| k = | 9.0000E+01 | 9.0000E+01 | 0.0000E+00 | −9.9889E+00 | 4.9857E+01 |
| A4 = | 4.6869E−01 | 8.0467E−01 | −5.8417E−01 | −4.0103E+00 | −3.8282E+00 |
| A6 = | −1.9587E−01 | 1.7901E+00 | 1.0316E+01 | 3.1196E+01 | 1.8707E+01 |
| A8 = | 3.2742E−02 | −2.5002E+01 | −4.0444E+02 | −3.6261E+02 | −1.6227E+02 |
| A10 = | 6.5576E−01 | 1.6504E+02 | 6.9581E+03 | 3.1841E+03 | 1.1808E+03 |
| A12 = | −7.2844E−01 | −5.7996E+02 | −7.2348E+04 | −1.8123E+04 | −4.8865E+03 |
| A14 = | 4.7604E−01 | 1.1454E+03 | 4.1046E+05 | 5.7379E+04 | 1.1289E+04 |
| A16 = | 6.1341E−02 | −9.6765E+02 | −9.9874E+05 | −7.7151E+04 | −1.1553E+04 |

TABLE 12-continued

Aspheric Coefficients

| Surface # | | | | | |
|---|---|---|---|---|---|
| | 7 | 8 | 9 | 10 | 11 |
| k = | −2.6033E+01 | −4.6288E+00 | −4.3003E+00 | −7.7172E+00 | −3.7246E+00 |
| A4 = | −4.3242E−01 | 2.0056E+00 | −2.3338E+00 | −6.6680E−01 | −6.6710E−01 |
| A6 = | −1.8042E+00 | −8.6827E+00 | 1.1573E+01 | 7.1073E−01 | 1.2080E+00 |
| A8 = | 5.2563E+00 | 9.2005E+00 | −4.2736E+01 | −2.2707E+00 | −2.3135E+00 |
| A10 = | −2.9098E+00 | 4.9669E+01 | 9.5100E+01 | 6.3425E+00 | 3.2917E+00 |
| A12 = | −1.4528E+00 | −1.8589E+02 | −9.7851E+01 | −9.0693E+00 | −2.8946E+00 |
| A14 = | −3.1305E+00 | 2.4951E+02 | 3.6333E+01 | 6.7040E+00 | 1.3817E+00 |
| A16 = | −2.0845E+00 | −1.2891E+02 | −1.0284E+00 | −2.0210E+00 | −2.7238E−01 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.30 | TTL/ImgH | 2.55 |
| Fno | 1.97 | (R3 + R4)/(R3 − R4) | 1.00 |
| HFOV (deg.) | 42.0 | R10/f | 0.28 |
| FOV (deg.) | 84.0 | |f2/f1| | 0.01 |
| V1/V2 | 1.00 | f2/f4 | 1.53 |
| T12/(T23 + T34 + T45) | 1.98 | f4/f5 | −0.63 |
| ΣCT/Td | 0.76 | | |

7th Embodiment

Figure 13:
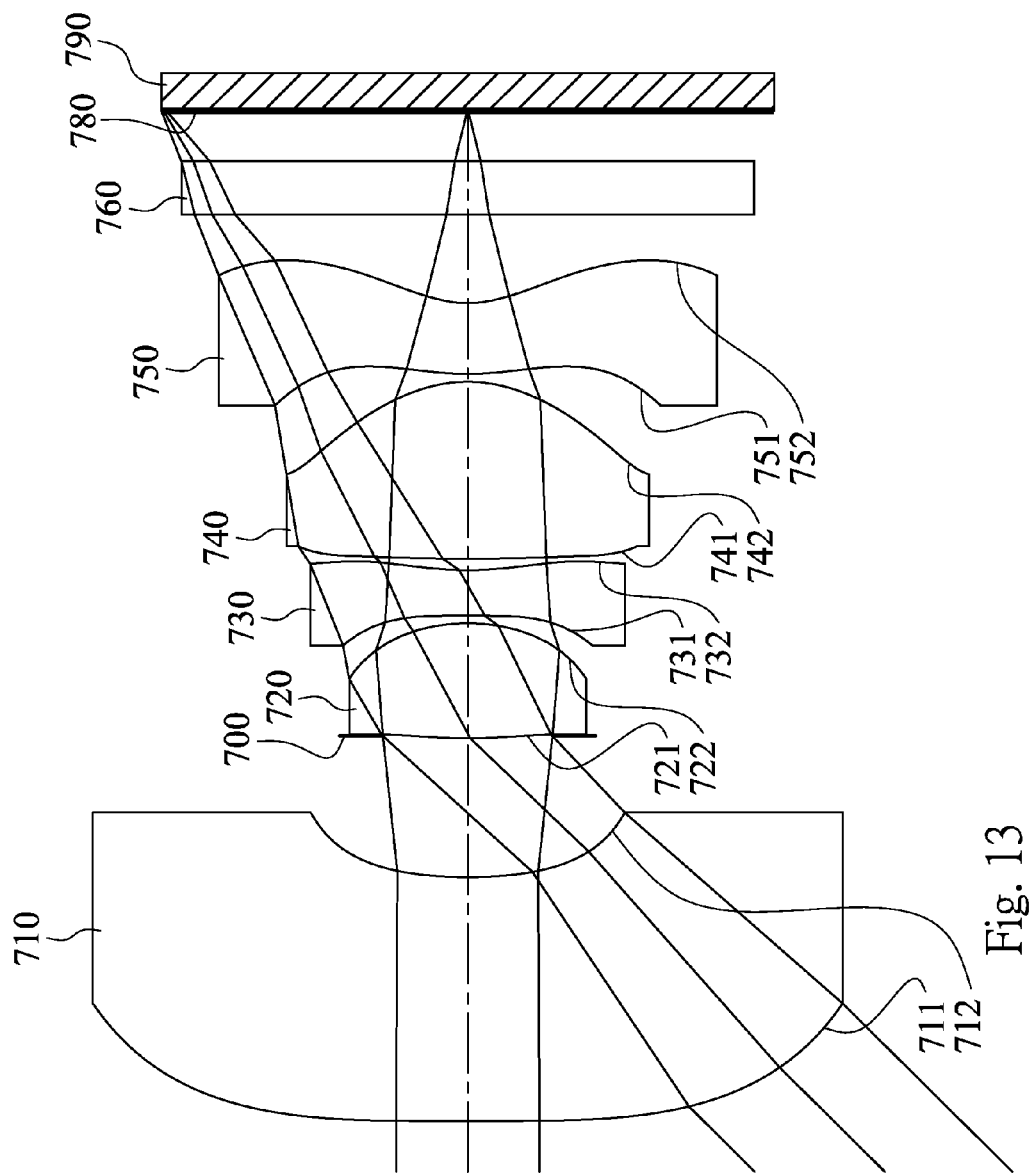
FIG. 13 is a schematic view of an image capturing device according to the 7th embodiment of the present disclosure.
Figure 14:
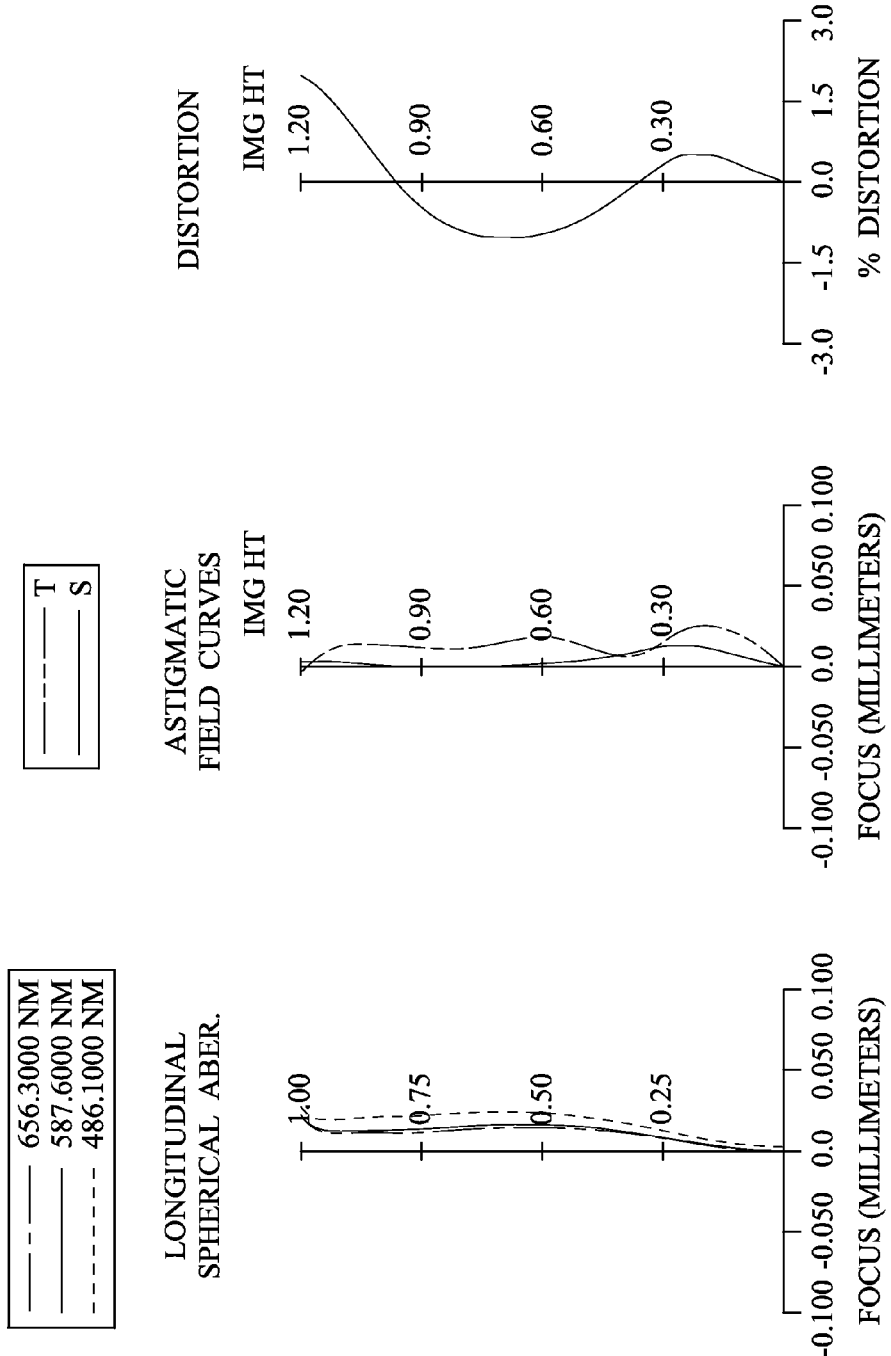
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows, in order from left to right, spherical aberration curves, astigmatic field curves and a distortion curve of the image capturing device according to the 7th embodiment.

In FIG. 13, the image capturing device includes the imaging optical system (its reference numeral is omitted) of the present disclosure and an image sensor 790. The imaging optical system includes, in order from an object side to an image side, a first lens element 710, an aperture stop 700, a second lens element 720, a third lens element 730, a fourth lens element 740, a fifth lens element 750, an IR-cut filter 760 and an image plane 780. The image sensor 790 is located on or near the image plane 780 of the imaging optical system. The imaging optical system has a total of five lens elements (710-750) with refractive power.

The first lens element 710 with negative refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. Furthermore, the image-side surface 732 of the third lens element 730 has at least one convex shape in an off-axial region thereon.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. Furthermore, the image-side surface 752 of the fifth lens element 750 has at least one convex shape in an off-axial region thereon.

The IR-cut filter 760 is made of glass material and located between the fifth lens element 750 and the image plane 780, and will not affect the focal length of the imaging optical system.

The detailed optical data of the 7th embodiment are shown in Table 13 and the aspheric surface data are shown in Table 14 below.

TABLE 13

7th Embodiment
f = 1.16 mm, Fno = 2.05, HFOV = 45.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 64.659 | ASP | 0.963 | Plastic | 1.530 | 55.8 | −3.38 |
| 2 | | 1.736 | ASP | 0.558 | | | | |
| 3 | Ape. Stop | Plano | | −0.009 | | | | |
| 4 | Lens 2 | 2.341 | ASP | 0.454 | Plastic | 1.544 | 55.9 | 1.16 |
| 5 | | −0.801 | ASP | 0.030 | | | | |
| 6 | Lens 3 | 95.088 | ASP | 0.180 | Plastic | 1.639 | 23.5 | −2.14 |
| 7 | | 1.345 | ASP | 0.045 | | | | |
| 8 | Lens 4 | 30.529 | ASP | 0.699 | Plastic | 1.544 | 55.9 | 1.00 |
| 9 | | −0.547 | ASP | 0.030 | | | | |
| 10 | Lens 5 | 1.042 | ASP | 0.280 | Plastic | 1.639 | 23.5 | −1.37 |
| 11 | | 0.425 | ASP | 0.350 | | | | |
| 12 | IR-cut filter | Plano | | 0.210 | Glass | 1.517 | 64.2 | — |
| 13 | | Plano | | 0.200 | | | | |
| 14 | Image | Plano | | — | | | | |

Note:
Reference wavelength is 587.6 nm (d-line).

TABLE 14

Aspheric Coefficients

| Surface # | | | | | |
|---|---|---|---|---|---|
| | 1 | 2 | 4 | 5 | 6 |
| k = | −9.0000E+01 | −1.1256E+01 | −1.6814E+01 | −4.3632E+00 | 9.0000E+01 |
| A4 = | 8.8097E−02 | 5.6624E−01 | −3.6208E−01 | −3.0417E+00 | −3.2291E+00 |
| A6 = | 2.6028E−02 | 3.9573E+00 | 1.1092E+01 | 2.5410E+01 | 1.8970E+01 |
| A8 = | −7.4141E−02 | −4.3872E+01 | −4.1122E+02 | −3.4270E+02 | −1.7589E+02 |
| A10 = | 8.3869E−02 | 3.1122E+02 | 6.9680E+03 | 3.1205E+03 | 1.1035E+03 |
| A12 = | −4.9627E−04 | −1.1931E+03 | −7.2348E+04 | −1.8067E+04 | −4.6013E+03 |
| A14 = | 1.5442E−02 | 2.3957E+03 | 4.1046E+05 | 5.7379E+04 | 1.1289E+04 |
| A16 = | −1.9323E−03 | −1.9231E+03 | −9.9874E+05 | −7.7151E+04 | −1.1553E+04 |

| Surface # | | | | | |
|---|---|---|---|---|---|
| | 7 | 8 | 9 | 10 | 11 |
| k = | −6.7059E+00 | −9.0000E+01 | −5.1796E+00 | −1.7559E+01 | −3.9706E+00 |
| A4 = | −6.5630E−01 | 9.5232E−01 | −2.2364E+00 | −9.6711E−01 | −9.2167E−01 |
| A6 = | −1.4319E+00 | −6.5404E+00 | 1.1115E+01 | 5.7235E−01 | 1.6666E+00 |
| A8 = | 5.3514E+00 | 9.2200E+00 | −4.2047E+01 | −1.9766E+00 | −2.7246E+00 |
| A10 = | −5.1623E+00 | 4.8478E+01 | 9.3292E+01 | 7.0676E+00 | 3.3649E+00 |
| A12 = | 3.4471E+00 | −1.8747E+02 | −1.0160E+02 | −1.0758E+01 | −2.8179E+00 |
| A14 = | 1.9622E+01 | 2.5119E+02 | 3.7597E+01 | 4.2714E+00 | 1.3576E+00 |
| A16 = | −4.3642E+01 | −1.2404E+02 | 1.3189E+01 | 2.3031E+00 | −2.7877E−01 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.16 | TTL/ImgH | 3.27 |
| Fno | 2.05 | (R3 + R4)/(R3 − R4) | 0.49 |
| HFOV (deg.) | 45.2 | R10/f | 0.37 |

-continued

| 7th Embodiment | | | |
|---|---|---|---|
| FOV (deg.) | 90.4 | |f2/f1| | 0.34 |
| V1/V2 | 1.00 | f2/f4 | 1.16 |
| T12/(T23 + T34 + T45) | 5.23 | f4/f5 | −0.73 |
| ΣCT/Td | 0.80 | | |

8th Embodiment

Figure 15:
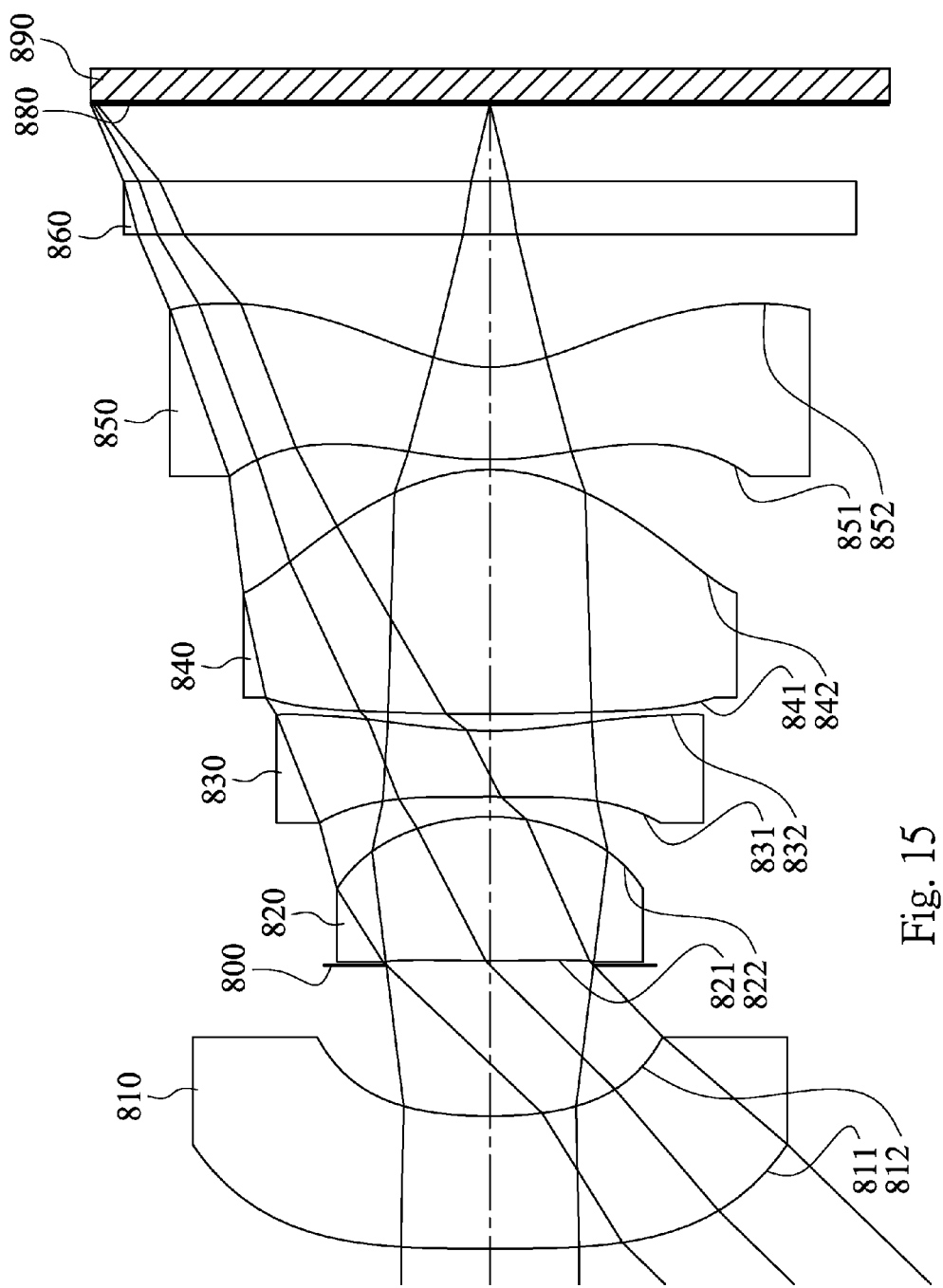
FIG. 15 is a schematic view of an image capturing device according to the 8th embodiment of the present disclosure.
Figure 16:
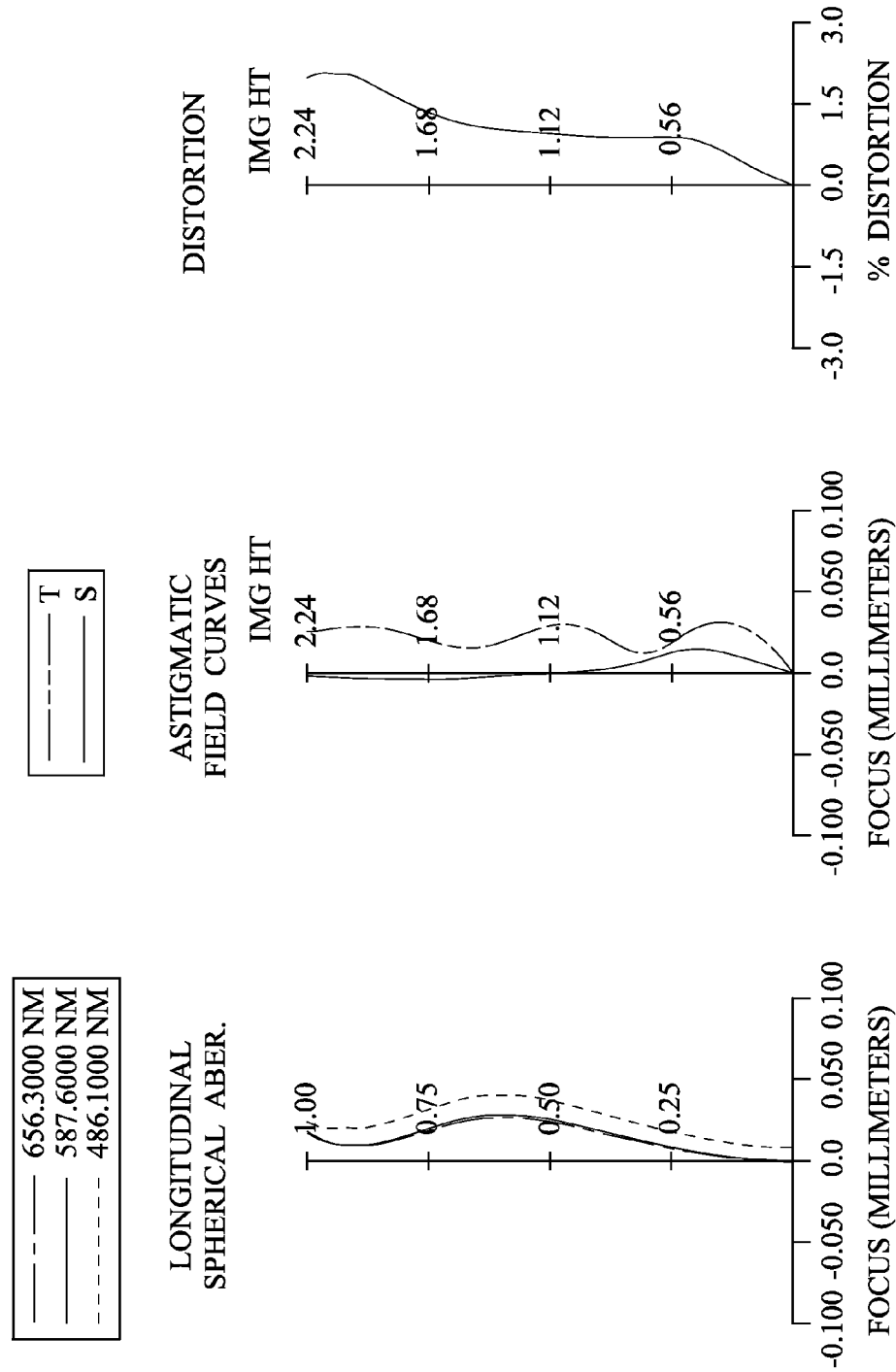
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows, in order from left to right, spherical aberration curves, astigmatic field curves and a distortion curve of the image capturing device according to the 8th embodiment.

In FIG. 15, the image capturing device includes the imaging optical system (its reference numeral is omitted) of the present disclosure and an image sensor 890. The imaging optical system includes, in order from an object side to an image side, a first lens element 810, an aperture stop 800, a second lens element 820, a third lens element 830, a fourth lens element 840, a fifth lens element 850, an IR-cut filter 860 and an image plane 880. The image sensor 890 is located on or near the image plane 880 of the imaging optical system. The imaging optical system has a total of five lens elements (810-850) with refractive power.

The first lens element 810 with negative refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being convex in a paraxial region thereof. The second lens element 820 is made of glass material and has the object-side surface 821 and the image-side surface 822 being both aspheric.

The third lens element 830 with negative refractive power has an object-side surface 831 being planar in a paraxial region thereof and an image-side surface 832 being concave in a paraxial region thereof. The third lens element 830 is made of plastic material and has the object-side surface 831 and the image-side surface 832 being both aspheric. Furthermore, the image-side surface 832 of the third lens element 830 has at least one convex shape in an off-axial region thereon.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. Furthermore, the image-side surface 852 of the fifth lens element 850 has at least one convex shape in an off-axial region thereon.

The IR-cut filter 860 is made of glass material and located between the fifth lens element 850 and the image plane 880, and will not affect the focal length of the imaging optical system.

The detailed optical data of the 8th embodiment are shown in Table 15 and the aspheric surface data are shown in Table 16 below.

TABLE 15

8th Embodiment
f = 2.13 mm, Fno = 2.12, HFOV = 45.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 34.152 | ASP | 0.747 | Plastic | 1.530 | 55.8 | −5.47 |
| 2 | | 2.653 | ASP | 0.853 | | | | |
| 3 | Ape. Stop | Plano | | 0.024 | | | | |
| 4 | Lens 2 | 12.209 | ASP | 0.812 | Glass | 1.542 | 62.9 | 2.30 |
| 5 | | −1.358 | ASP | 0.113 | | | | |
| 6 | Lens 3 | ∞ | ASP | 0.373 | Plastic | 1.633 | 23.4 | −4.22 |
| 7 | | 2.673 | ASP | 0.094 | | | | |
| 8 | Lens 4 | 22.759 | ASP | 1.379 | Plastic | 1.544 | 55.9 | 1.90 |
| 9 | | −1.059 | ASP | 0.056 | | | | |
| 10 | Lens 5 | 1.848 | ASP | 0.523 | Plastic | 1.650 | 21.4 | −3.07 |
| 11 | | 0.852 | ASP | 0.747 | | | | |
| 12 | IR-cut filter | Plano | | 0.300 | Glass | 1.517 | 64.2 | — |
| 13 | | Plano | | 0.443 | | | | |
| 14 | Image | Plano | | — | | | | |

Note:
Reference wavelength is 587.6 nm (d-line).

TABLE 16

Aspheric Coefficients

| | Surface # | | | | |
|---|---|---|---|---|---|
| | 1 | 2 | 4 | 5 | 6 |
| k = | −9.0000E+01 | −3.4864E+00 | −7.8691E+01 | −6.1698E+00 | 0.0000E+00 |
| A4 = | 9.6515E−02 | 2.0794E−01 | −9.5710E−02 | −4.2540E−01 | −2.0893E−01 |
| A6 = | −3.3057E−02 | 2.7384E−01 | 2.7733E−01 | 8.3331E−01 | 3.2545E−01 |
| A8 = | 1.1219E−02 | −1.4005E+00 | −4.4320E+00 | −3.8509E+00 | −1.5008E+00 |
| A10 = | 1.7447E−03 | 4.0737E+00 | 2.4131E+01 | 1.1032E+01 | 3.6232E+00 |
| A12 = | −2.9113E−03 | −6.2754E+00 | −7.5455E+01 | −1.8843E+01 | −4.8014E+00 |
| A14 = | 1.0459E−03 | 5.1712E+00 | 1.2286E+02 | 1.7175E+01 | 3.3791E+00 |
| A16 = | −1.2810E−04 | −1.7361E+00 | −8.5793E+01 | −6.6273E+00 | −9.9242E−01 |

TABLE 16-continued

Aspheric Coefficients

| Surface # | | | | |
|---|---|---|---|---|
| 7 | 8 | 9 | 10 | 11 |
| k = 5.9085E−01 | −7.8266E+01 | −5.4012E+00 | −6.1078E+00 | −3.4586E+00 |
| A4 = −9.9844E−02 | 7.9604E−02 | −3.2046E−01 | −1.7205E−01 | −1.3659E−01 |
| A6 = −8.3294E−02 | −1.6983E−01 | 4.5017E−01 | 7.8709E−02 | 6.8729E−02 |
| A8 = 9.4541E−02 | 6.5276E−02 | −4.7585E−01 | −6.0236E−02 | −3.0326E−02 |
| A10 = −1.2817E−02 | 1.6085E−01 | 3.1417E−01 | 3.6974E−02 | 1.1202E−02 |
| A12 = −1.1131E−02 | −1.8826E−01 | −1.1008E−01 | −1.0230E−02 | −2.9506E−03 |
| A14 = 2.4957E−03 | 7.8561E−02 | 1.6329E−02 | −5.2082E−05 | 4.4260E−04 |
| A16 = −5.8039E−04 | −1.1954E−02 | −1.3265E−04 | 3.2718E−04 | −2.7624E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.13 | TTL/ImgH | 2.84 |
| Fno | 2.12 | (R3 + R4)/(R3 − R4) | 0.80 |
| HFOV (deg.) | 45.7 | R10/f | 0.40 |
| FOV (deg.) | 91.4 | |f2/f1| | 1.21 |
| V1/V2 | 0.89 | f2/f4 | −0.62 |
| T12/(T23 + T34 + T45) | 3.33 | f4/f5 | |
| ΣCT/Td | 0.77 | | |

9th Embodiment

Figure 17:
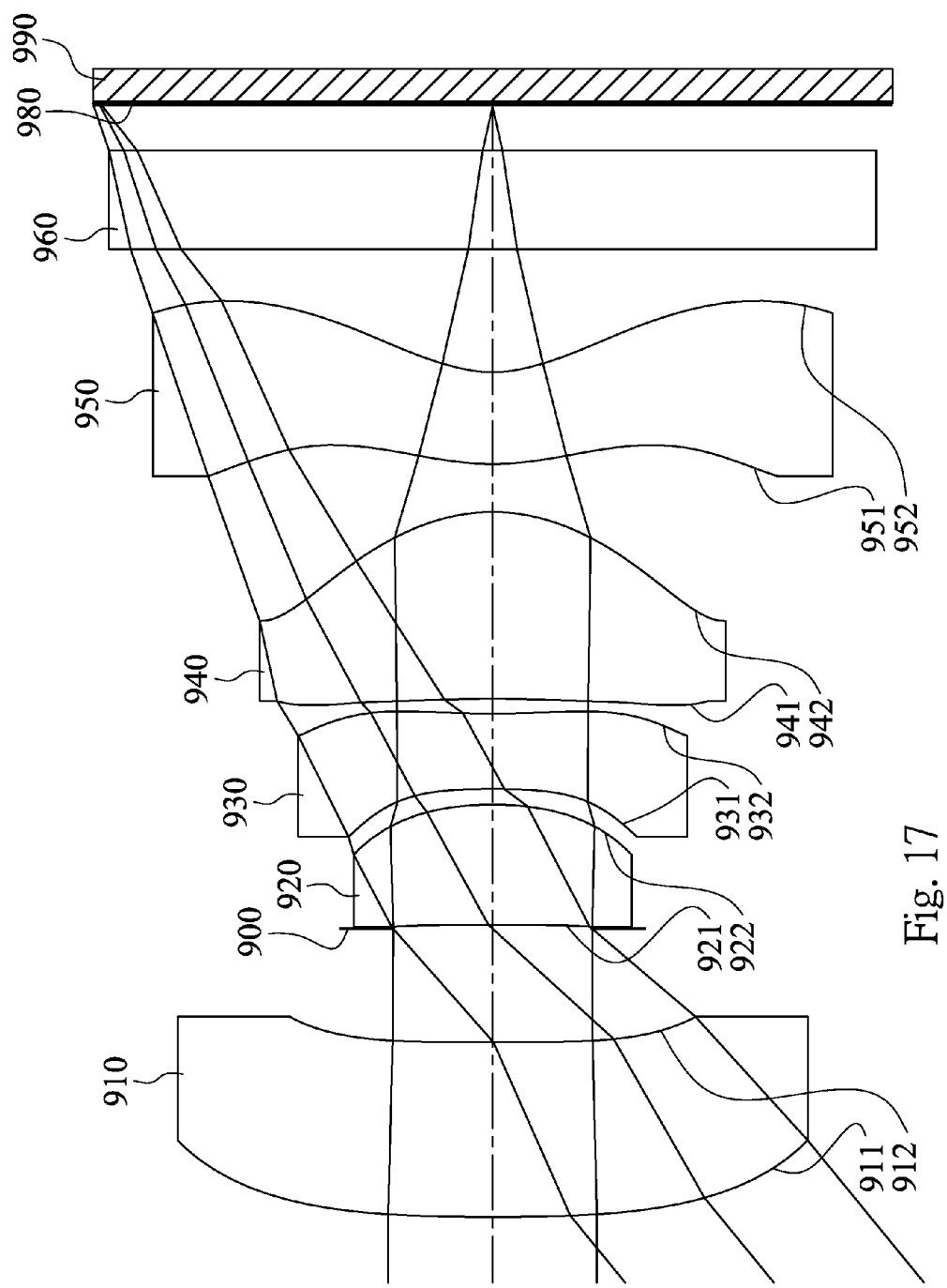
FIG. 17 is a schematic view of an image capturing device according to the 9th embodiment of the present disclosure.
Figure 18:
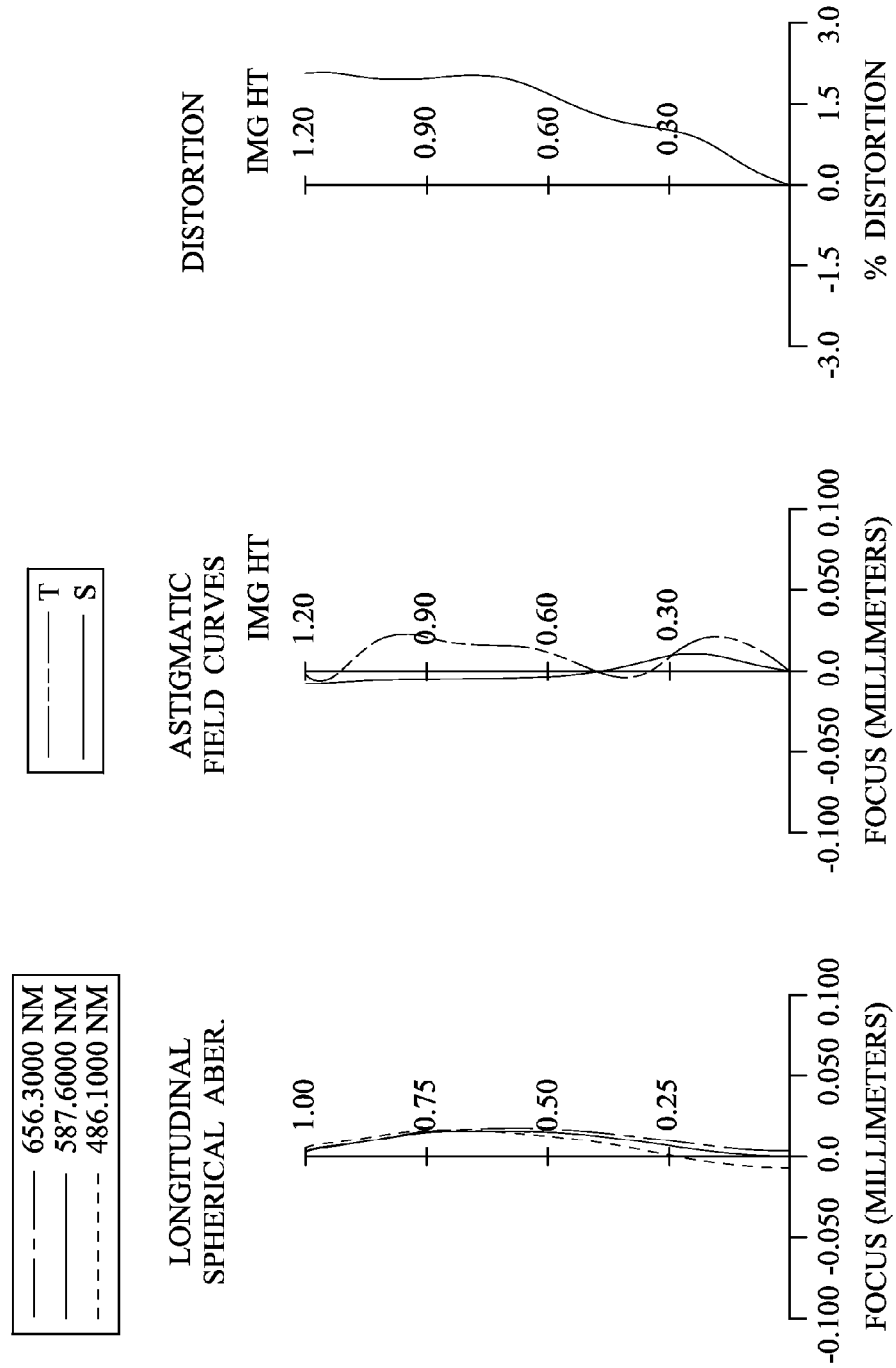
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows, in order from left to right, spherical aberration curves, astigmatic field curves and a distortion curve of the image capturing device according to the 9th embodiment.

In FIG. 17, the image capturing device includes the imaging optical system (its reference numeral is omitted) of the present disclosure and an image sensor 990. The imaging optical system includes, in order from an object side to an image side, a first lens element 910, an aperture stop 900, a second lens element 920, a third lens element 930, a fourth lens element 940, a fifth lens element 950, an IR-cut filter 960 and an image plane 980. The image sensor 990 is located on or near the image plane 980 of the imaging optical system. The imaging optical system has a total of five lens elements (910-950) with refractive power.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric.

The third lens element 930 with negative refractive power has an object-side surface 931 being concave in a paraxial region thereof and an image-side surface 932 being concave in a paraxial region thereof. The third lens element 930 is made of plastic material and has the object-side surface 931 and the image-side surface 932 being both aspheric. Furthermore, the image-side surface 932 of the third lens element 930 has at least one convex shape in an off-axial region thereon.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. Furthermore, the image-side surface 952 of the fifth lens element 950 has at least one convex shape in an off-axial region thereon.

The IR-cut filter 960 is made of glass material and located between the fifth lens element 950 and the image plane 980, and will not affect the focal length of the imaging optical system.

The detailed optical data of the 9th embodiment are shown in Table 17 and the aspheric surface data are shown in Table 18 below.

TABLE 17

9th Embodiment
f = 1.43 mm, Fno = 2.25, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.694 | ASP | 0.533 | Plastic | 1.633 | 23.4 | 13.75 |
| 2 | | 64.803 | ASP | 0.346 | | | | |
| 3 | Ape. Stop | Plano | | 0.012 | | | | |
| 4 | Lens 2 | −12.296 | ASP | 0.366 | Plastic | 1.544 | 55.9 | 2.04 |
| 5 | | −1.029 | ASP | 0.048 | | | | |
| 6 | Lens 3 | −2.841 | ASP | 0.230 | Plastic | 1.633 | 23.4 | −2.41 |
| 7 | | 3.382 | ASP | 0.045 | | | | |
| 8 | Lens 4 | −3.120 | ASP | 0.569 | Plastic | 1.544 | 55.9 | 1.18 |
| 9 | | −0.566 | ASP | 0.146 | | | | |
| 10 | Lens 5 | 0.791 | ASP | 0.280 | Plastic | 1.535 | 55.7 | −2.21 |
| 11 | | 0.416 | ASP | 0.375 | | | | |
| 12 | IR-cut filter | Plano | | 0.300 | Glass | 1.517 | 64.2 | — |
| 13 | | Plano | | 0.145 | | | | |
| 14 | Image | Plano | | — | | | | |

Note:
Reference wavelength is 587.6 nm (d-line).

TABLE 18

Aspheric Coefficients

| | | | Surface # | | |
|---|---|---|---|---|---|
| | 1 | 2 | 4 | 5 | 6 |
| k = | −9.0000E+01 | −9.0000E+01 | 7.2071E+01 | −3.5963E+00 | 3.7895E+01 |
| A4 = | 2.1338E−01 | 3.7895E−01 | −1.3414E−01 | −2.9036E+00 | −3.8744E+00 |
| A6 = | −2.2191E−02 | 2.6806E+00 | 1.4257E+00 | 1.1641E+01 | 1.1077E+01 |
| A8 = | −1.7331E−01 | −3.2104E+01 | 1.9769E+01 | −8.7012E+01 | −4.4190E+01 |
| A10 = | 5.8305E−01 | 1.9125E+02 | −3.3005E+03 | 6.9259E+02 | 1.9954E+02 |
| A12 = | −6.9807E−01 | −6.0991E+02 | 6.6783E+04 | −6.3783E+03 | −2.2712E+03 |
| A14 = | 3.8828E−01 | 1.0086E+03 | −5.6992E+05 | 3.0845E+04 | 1.1732E+04 |
| A16 = | −5.7847E−02 | −6.6967E+02 | 1.7726E+06 | −5.4156E+04 | −9.8157E+03 |

| | | | Surface # | | |
|---|---|---|---|---|---|
| | 7 | 8 | 9 | 10 | 11 |
| k = | −2.9174E+01 | 9.7312E+00 | −4.5040E+00 | −1.0451E+01 | −3.4181E+00 |
| A4 = | −6.4588E−01 | 1.4797E+00 | −2.4115E+00 | −7.7383E−01 | −7.2597E−01 |
| A6 = | −2.6943E+00 | −7.8970E+00 | 1.1793E+01 | 7.1059E−01 | 1.2643E+00 |
| A8 = | 5.8189E+00 | 1.0125E+01 | −4.2653E+01 | −2.2067E+00 | −2.3593E+00 |
| A10 = | −2.7108E+00 | 4.9749E+01 | 9.4638E+01 | 6.3882E+00 | 3.2990E+00 |
| A12 = | −2.4686E+00 | −1.8715E+02 | −9.8679E+01 | −9.0855E+00 | −2.8876E+00 |
| A14 = | 5.6402E+00 | 2.4826E+02 | 3.6508E+01 | 6.6873E+00 | 1.3791E+00 |
| A16 = | 4.8087E+01 | −1.2208E+02 | 2.6815E+00 | −2.0385E+00 | −2.7242E−01 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.43 | TTL/ImgH | 2.77 |
| Fno | 2.25 | (R3 + R4)/(R3 − R4) | 1.18 |
| HFOV (deg.) | 39.2 | R10/f | 0.29 |
| FOV (deg.) | 78.4 | |f2/f1| | 0.16 |

-continued

| 9th Embodiment | | | |
|---|---|---|---|
| V1/V2 | 0.42 | f2/f4 | 2.69 |
| T12/(T23 + T34 + T45) | 1.50 | f4/f5 | −0.62 |
| ΣCT/Td | 0.77 | | |

<10th Embodiment>

Figure 19:
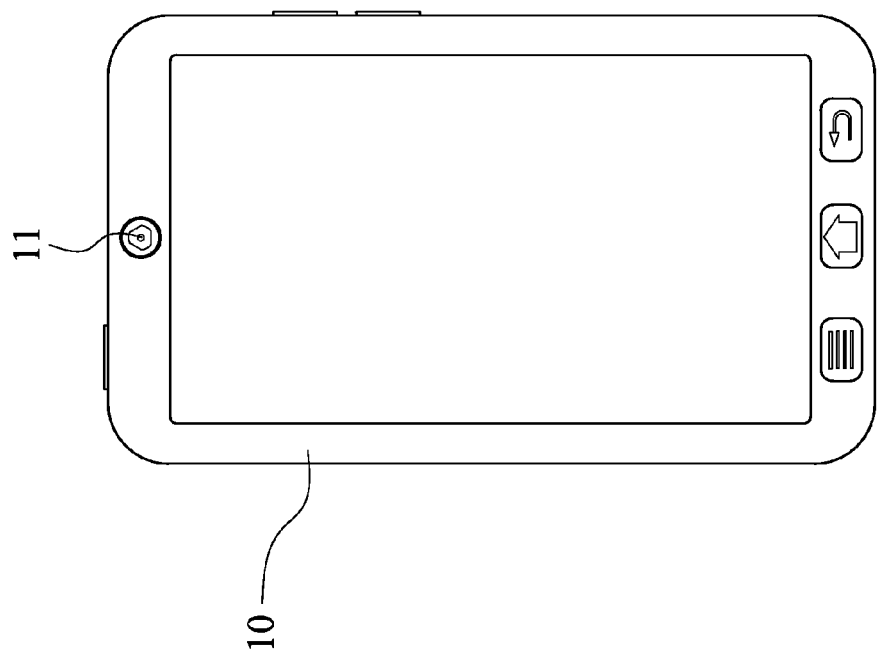
FIG. 19 shows a mobile terminal according to the 10th embodiment of the present disclosure.

FIG. 19 is a schematic view of a mobile terminal 10 according to the 10th embodiment of the present disclosure. The mobile terminal 10 of the 10th embodiment is a smart phone, wherein the mobile terminal 10 includes an image capturing device 11. The image capturing device 11 includes an imaging optical system (its reference numeral is omitted) according to the present disclosure and an image sensor (its reference numeral is omitted), wherein the image sensor is located on or near an image plane of the imaging optical system.

11th Embodiment

Figure 20:
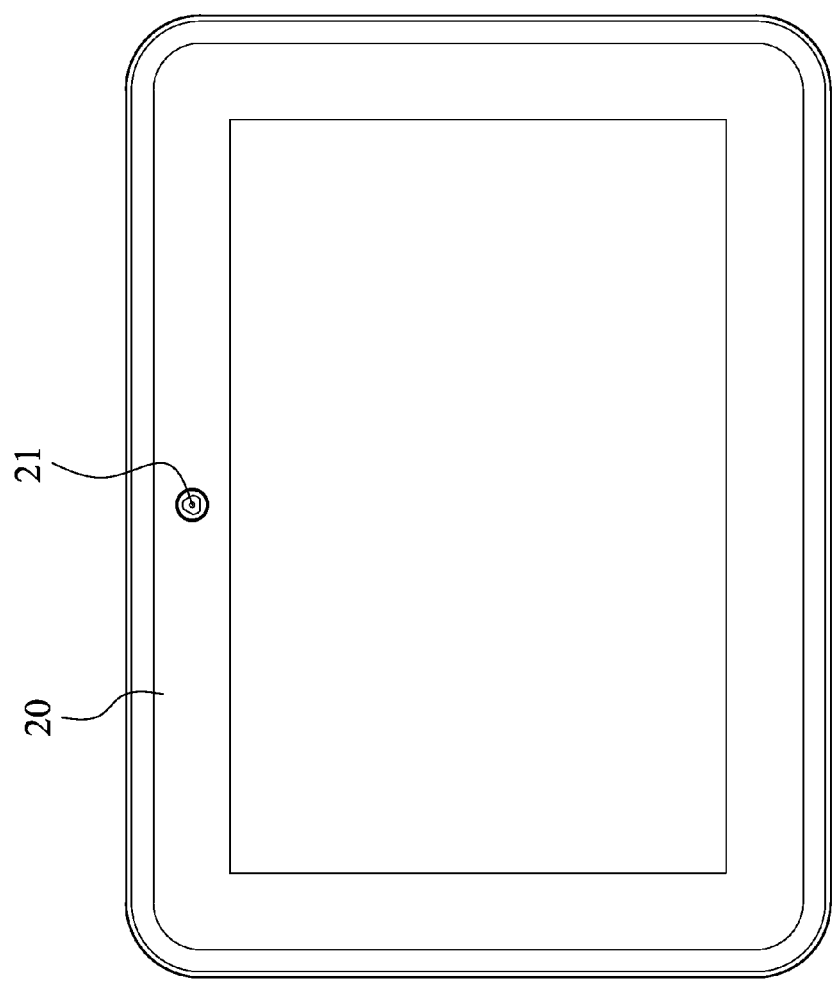
FIG. 20 shows a mobile terminal according to the 11th embodiment of the present disclosure.

FIG. 20 is a schematic view of a mobile terminal 20 according to the 11th embodiment of the present disclosure. The mobile terminal 20 of the 11th embodiment is a tablet personal computer, wherein the mobile terminal 20 includes an image capturing device 21. The image capturing device 21 includes an imaging optical system (its reference numeral is omitted) according to the present disclosure and an image sensor (its reference numeral is omitted), wherein the image sensor is located on or near an image plane of the imaging optical system.

12th Embodiment

Figure 21:
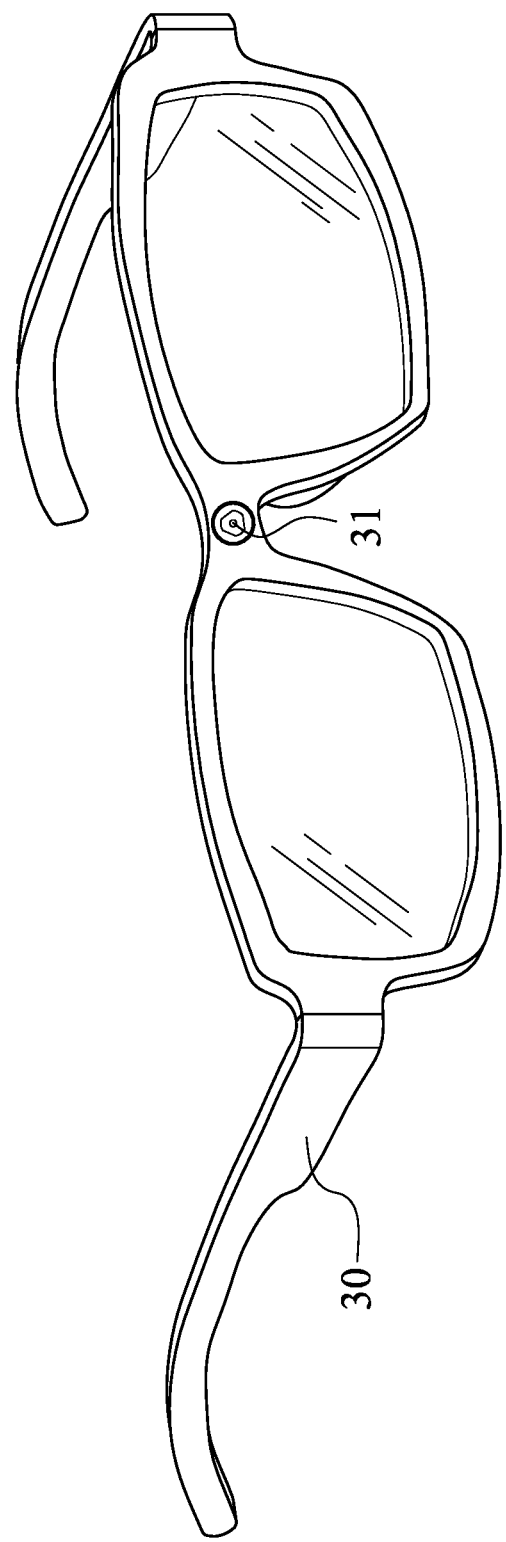
FIG. 21 shows a mobile terminal according to the 12th embodiment of the present disclosure.

FIG. 21 is a schematic view of a mobile terminal 30 according to the 12th embodiment of the present disclosure. The mobile terminal 30 of the 12th embodiment is a head-mounted display, wherein the mobile terminal 30 includes an image capturing device 31. The image capturing device 31 includes an imaging optical system (its reference numeral is omitted) according to the present disclosure and an image sensor (its reference numeral is omitted), wherein the image sensor is located on or near an image plane of the imaging optical system.

The foregoing description, for purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical system comprising, in order from an object side to an image side:
    a first lens element having an object-side surface being convex in a paraxial region thereof and an image-side surface being concave in a paraxial region thereof;
    a second lens element with positive refractive power having an image-side surface being convex in a paraxial region thereof;
    a third lens element with negative refractive power having an image-side surface being concave in a paraxial region thereof;
    a fourth lens element with positive refractive power having an image-side surface being convex in a paraxial region thereof; and
    a fifth lens element with negative refractive power having an image-side surface being concave in a paraxial region thereof, wherein an object-side surface and the image-side surface of the fifth lens element are aspheric, and the image-side surface of the fifth lens element has at least one convex shape in an off-axial region thereon;
    wherein the imaging optical system has a total of five lens elements, a focal length of the first lens element is f1, a focal length of the second lens element is f2, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of an object-side surface of the second lens element is R3, a curvature radius of the image-side surface of the second lens element is R4, an Abbe number of the first lens element is V1, an Abbe number if the second lens element is V2, and the following conditions are satisfied:

$|f2/f1|<0.70$;

$0.60<T12/(T23+T34+T45)$;

$0.40<(R3+R4)/(R3-R4)$;

and $0.20<V1/V2<0.50$.

2. The imaging optical system of claim 1, further comprising
    a stop disposed between the first lens element and the second lens element.

3. The imaging optical system of claim 2, wherein a maximal field of view of the imaging optical system is FOV, and the following condition is satisfied:

80 degree<FOV<110 degree.

4. The imaging optical system of claim 2, wherein the image-side surface of the third lens element has at least one convex shape in an off-axial region thereon.

5. The imaging optical system of claim 2, wherein the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, and the following condition is satisfied:

$1.8<T12/(T23+T34+T45)<6.0$.

6. The imaging optical system of claim 2, wherein a focal length of the fourth lens element is f4, a focal length of the fifth lens element is f5, and the following condition is satisfied:

$-0.65<f4/f5<-0.20$.

7. The imaging optical system of claim 1, wherein the focal length of the first lens element is f1, the focal length of the second lens element is f2, and the following condition is satisfied:

$|f2/f1|<0.50$.

8. The imaging optical system of claim 1, wherein a sum of the central thicknesses of the first lens element, the second lens element, the third lens element, the fourth lens element and the fifth lens element is $\Sigma CT$, an axial distance between the object-side surface of the first lens element and the image-side surface of the fifth lens element is Td, and the following condition is satisfied:

$0.75<\Sigma CT/Td<0.90$.

9. The imaging optical system of claim 1, wherein the curvature radius of the object-side surface of the second lens element is R3, the curvature radius of the image-side surface of the second lens element is R4, and the following condition is satisfied:

$0.60<(R3+R4)/(R3-R4)<2.0$.

10. The imaging optical system of claim 1, wherein the object-side surface of the fifth lens element is convex in a paraxial region thereof.

11. The imaging optical system of claim 10, wherein a focal length of the imaging optical system is f, a curvature radius of the image-side surface of the fifth lens element is R10, and the following condition is satisfied:

0.20<R10/f<0.50.

12. The imaging optical system of claim 10, wherein the focal length of the second lens element is f2, the focal length of the fourth lens element is f4, and the following condition is satisfied:

1.25<f2/f4<3.0.

13. The imaging optical system of claim 10, wherein an axial distance between the object-side surface of the first lens element and an image plane is TTL, a maximum image height of the imaging optical system is ImgH, and the following condition is satisfied:

TTL/ImgH<3.0.

14. An image capturing device, comprising:
the imaging optical system of claim 1; and
an image sensor, wherein the image sensor is located on or near an image plane of the imaging optical system.

15. A mobile terminal, comprising:
the image capturing device of claim 14.

16. An imaging optical system comprising, in order from an object side to an image side:
a first lens element having an object-side surface being convex in a paraxial region thereof and an image-side surface being concave in a paraxial region thereof;
a second lens element with positive refractive power having an image-side surface being convex in a paraxial region thereof;
a third lens element having negative refractive power;
a fourth lens element with positive refractive power having an image-side surface being convex in a paraxial region thereof; and
a fifth lens element with negative refractive power having an image-side surface being concave in a paraxial region thereof, wherein an object-side surface and the image-side surface of the fifth lens element are aspheric, and the image-side surface of the fifth lens element has at least one convex shape in an off-axial region thereon;
wherein the imaging optical system has a total of five lens elements, a focal length of the first lens element is f1, a focal length of the second lens element is f2, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of an object-side surface of the second lens element is R3, a curvature radius of the image-side surface of the second lens element is R4, and the following conditions are satisfied:

|f2/f1|<0.70;

1.8<T12/(T23+T34+T45);

and

−0.1<(R3+R4)/(R3−R4).

17. The imaging optical system of claim 16, wherein the curvature radius of the object-side surface of the second lens element is R3, the curvature radius of the image-side surface of the second lens element is R4, and the following condition is satisfied:

0.60<(R3+R4)/(R3−R4)<2.0.

18. The imaging optical system of claim 16, wherein the object-side surface of the fifth lens element is convex in a paraxial region thereof.

19. The imaging optical system of claim 18, wherein a sum of the central thicknesses of the first lens element, the second lens element, the third lens element, the fourth lens element and the fifth lens element is ΣCT, an axial distance between the object-side surface of the first lens element and the image-side surface of the fifth lens element is Td, and the following condition is satisfied:

0.75<ΣCT/Td<0.90.

20. The imaging optical system of claim 18, wherein the focal length of the first lens element is f1, the focal length of the second lens element is f2, and the following condition is satisfied:

|f2/f1|<0.50.

21. The imaging optical system of claim 16, wherein a maximal field of view of the imaging optical system is FOV, and the following condition is satisfied:

80 degree<FOV<110 degree.

22. The imaging optical system of claim 16, wherein an axial distance between the object-side surface of the first lens element and an image plane is TTL, a maximum image height of the imaging optical system is ImgH, and the following condition is satisfied:

TTL/ImgH<3.0.

23. The imaging optical system of claim 16, wherein the image-side surface of the third lens element has at least one convex shape in an off-axial region thereon.

24. An image capturing device, comprising:
the imaging optical system of claim 16; and
an image sensor, wherein the image sensor is located on or near an image plane of the imaging optical system.

25. A mobile terminal, comprising:
the image capturing device of claim 24.

26. An imaging optical system comprising, in order from an object side to an image side:
a first lens element having an object-side surface being convex in a paraxial region thereof and an image-side surface being concave in a paraxial region thereof;
a second lens element with positive refractive power having an image-side surface being convex in a paraxial region thereof;
a third lens element with negative refractive power having an image-side surface being concave in a paraxial region thereof;
a fourth lens element with positive refractive power having an image-side surface being convex in a paraxial region thereof; and
a fifth lens element with negative refractive power having an image-side surface being concave in a paraxial region thereof, wherein an object-side surface and the image-side surface of the fifth lens element are aspheric, and the image-side surface of the fifth lens element has at least one convex shape in an off-axial region thereon;
wherein the imaging optical system has a total of five lens elements, a focal length of the first lens element is f1, a focal length of the second lens element is f2, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of an object-side surface of the second lens element is R3, a curvature radius of the image-side surface of the second lens element is R4, and the following conditions are satisfied:

$|f2/f1|<0.70;$ $0.60<T12/(T23+T34+T45);$ and $0.60<(R3+R4)/(R3-R4)<2.0.$

27. The imaging optical system of claim 26, further comprising a stop disposed between the first lens element and the second lens element.

28. The imaging optical system of claim 27, wherein a maximal field of view of the imaging optical system is FOV, and the following condition is satisfied:

80 degree<FOV<110 degree.

29. The imaging optical system of claim 27, wherein the image-side surface of the third lens element has at least one convex shape in an off-axial region thereon.

30. The imaging optical system of claim 27, wherein the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, and the following condition is satisfied:

$1.8<T12/(T23+T34+T45)<6.0.$

31. The imaging optical system of claim 27, wherein a focal length of the fourth lens element is f4, a focal length of the fifth lens element is f5, and the following condition is satisfied:

$-0.65<f4/f5<-0.20.$

32. The imaging optical system of claim 26, wherein the focal length of the first lens element is f1, the focal length of the second lens element is f2, and the following condition is satisfied:

$|f2/f1|<0.50.$

33. The imaging optical system of claim 26, wherein a sum of the central thicknesses of the first lens element, the second lens element, the third lens element, the fourth lens element and the fifth lens element is ΣCT, an axial distance between the object-side surface of the first lens element and the image-side surface of the fifth lens element is Td, and the following condition is satisfied:

$0.75<\Sigma CT/Td<0.90.$

34. The imaging optical system of claim 26, wherein an Abbe number of the first lens element is V1, an Abbe number of the second lens element is V2, and the following condition is satisfied:

$0.20<V1/V2<0.50.$

35. The imaging optical system of claim 26, wherein the object-side surface of the fifth lens element is convex in a paraxial region thereof.

36. The imaging optical system of claim 35, wherein a focal length of the imaging optical system is f, a curvature radius of the image-side surface of the fifth lens element is R10, and the following condition is satisfied:

$0.20<R10/f<0.50.$

37. The imaging optical system of claim 35, wherein the focal length of the second lens element is f2, the focal length of the fourth lens element is f4, and the following condition is satisfied:

$1.25<f2/f4<3.0.$

38. The imaging optical system of claim 35, wherein an axial distance between the object-side surface of the first lens element and an image plane is TTL, a maximum image height of the imaging optical system is ImgH, and the following condition is satisfied:

$TTL/ImgH<3.0.$

39. An image capturing device, comprising:

the imaging optical system of claim 26; and an image sensor, wherein the image sensor is located on or near an image plane of the imaging optical system.

40. A mobile terminal, comprising:

the image capturing device of claim 39.

* * * * *

UNITED STATES PATENT AND TRADEMARK OFFICE
CERTIFICATE OF CORRECTION

PATENT NO. : 9,335,514 B2
APPLICATION NO. : 14/446618
DATED : May 10, 2016
INVENTOR(S) : Dung-Yi Hsieh et al.

Page 1 of 1

It is certified that error appears in the above-identified patent and that said Letters Patent is hereby corrected as shown below:

In the Claims
(1) In column 36, lines 7-8, delete "an Abbe number if the second lens element" and insert therefor --an Abbe number of the second lens element--.
(2) In column 39, line 48, delete "|f2/f1< 0.50" and insert therefor --|f2/f1|< 0.50--.

Signed and Sealed this
Second Day of August, 2016

Michelle K. Lee
*Director of the United States Patent and Trademark Office*